US010025753B2

(12) United States Patent
Leonard et al.

(10) Patent No.: US 10,025,753 B2
(45) Date of Patent: Jul. 17, 2018

(54) COMPUTER-IMPLEMENTED SYSTEMS AND METHODS FOR TIME SERIES EXPLORATION

(71) Applicant: SAS Institute Inc., Cary, NC (US)

(72) Inventors: Michael James Leonard, Cary, NC (US); Edward Tilden Blair, Cary, NC (US); Jerzy Michal Brzezicki, Cary, NC (US); Udo V. Sglavo, Raleigh, NC (US); Sujatha Pothireddy, Apex, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/890,013

(22) Filed: Feb. 6, 2018

(65) Prior Publication Data

US 2018/0157619 A1   Jun. 7, 2018

Related U.S. Application Data

(63) Continuation of application No. 14/736,131, filed on Jun. 10, 2015, now Pat. No. 9,916,282, which is a
(Continued)

(51) Int. Cl.
*G06F 3/048* (2013.01)
*G06F 17/10* (2006.01)
(Continued)

(52) U.S. Cl.
CPC .............. *G06F 17/10* (2013.01); *G06F 17/18* (2013.01); *G06F 17/30716* (2013.01); *G06Q 10/04* (2013.01); *G06Q 30/02* (2013.01)

(58) Field of Classification Search
CPC ....................................................... G06F 17/10
(Continued)

(56) References Cited

U.S. PATENT DOCUMENTS 5,461,699 A   10/1995   Arbabi et al.
5,559,895 A   9/1996    Lee et al.
(Continued)

FOREIGN PATENT DOCUMENTS

WO   2005/124718 A2   12/2005

OTHER PUBLICATIONS

Aiolfi, Marco et al., "Forecast Combinations," CREATES Research Paper 2010-21, School of Economics and Management, Aarhus University, 35 pp. (May 6, 2010).
(Continued)

*Primary Examiner* — William Titcomb
(74) *Attorney, Agent, or Firm* — Kilpatrick Townsend & Stockton LLP

(57) ABSTRACT

Systems and methods are provided for analyzing unstructured time stamped data. A distribution of time-stamped data is analyzed to identify a plurality of potential time series data hierarchies for structuring the data. An analysis of a potential time series data hierarchy may be performed. The analysis of the potential time series data hierarchies may include determining an optimal time series frequency and a data sufficiency metric for each of the potential time series data hierarchies. One of the potential time series data hierarchies may be selected based on a comparison of the data sufficiency metrics. Multiple time series may be derived in a single-read pass according to the selected time series data hierarchy. A time series forecast corresponding to at least one of the derived time series may be generated.

30 Claims, 27 Drawing Sheets

Related U.S. Application Data continuation of application No. 13/548,307, filed on Jul. 13, 2012, now Pat. No. 9,087,306.

(51) Int. Cl.
| | | |
|---|---|---|
| G06F 17/30 | (2006.01) | |
| G06Q 30/02 | (2012.01) | |
| G06Q 10/04 | (2012.01) | |
| G06F 17/18 | (2006.01) | |

(58) Field of Classification Search
USPC .......................................................... 715/804
See application file for complete search history.

(56) References Cited

U.S. PATENT DOCUMENTS

| | | |
|---|---|---|
| 5,615,109 A | 3/1997 | Eder |
| 5,870,746 A | 2/1999 | Knutson et al. |
| 5,918,232 A | 6/1999 | Pouschine et al. |
| 5,926,822 A | 7/1999 | Garman |
| 5,953,707 A | 9/1999 | Huang et al. |
| 5,991,740 A | 11/1999 | Messer |
| 5,995,943 A | 11/1999 | Bull et al. |
| 6,052,481 A | 4/2000 | Grajski et al. |
| 6,128,624 A | 10/2000 | Papierniak et al. |
| 6,151,582 A | 11/2000 | Huang et al. |
| 6,151,584 A | 11/2000 | Papierniak et al. |
| 6,169,534 B1 | 1/2001 | Raffel et al. |
| 6,189,029 B1 | 2/2001 | Fuerst |
| 6,208,975 B1 | 3/2001 | Bull et al. |
| 6,216,129 B1 | 4/2001 | Eldering |
| 6,223,173 B1 | 4/2001 | Wakio et al. |
| 6,230,064 B1 | 5/2001 | Nakase et al. |
| 6,286,005 B1 | 9/2001 | Cannon |
| 6,308,162 B1 | 10/2001 | Ouimet et al. |
| 6,317,731 B1 | 11/2001 | Luciano |
| 6,334,110 B1 | 12/2001 | Walter et al. |
| 6,356,842 B1 | 3/2002 | Intriligator et al. |
| 6,397,166 B1 | 5/2002 | Leung et al. |
| 6,400,853 B1 | 6/2002 | Shiiyama |
| 6,526,405 B1 | 2/2003 | Mannila et al. |
| 6,539,392 B1 | 3/2003 | Rebane |
| 6,542,869 B1 | 4/2003 | Foote |
| 6,564,190 B1 | 5/2003 | Dubner |
| 6,570,592 B1 | 5/2003 | Sajdak et al. |
| 6,591,255 B1 | 7/2003 | Tatum et al. |
| 6,611,726 B1 | 8/2003 | Crosswhite |
| 6,640,227 B1 | 10/2003 | Andreev |
| 6,735,738 B1 | 5/2004 | Kojima |
| 6,775,646 B1 | 8/2004 | Tufillaro et al. |
| 6,792,399 B1 | 9/2004 | Phillips et al. |
| 6,850,871 B1 | 2/2005 | Barford et al. |
| 6,876,988 B2 | 4/2005 | Helsper et al. |
| 6,878,891 B1 | 4/2005 | Josten et al. |
| 6,928,398 B1 | 8/2005 | Fang et al. |
| 6,978,249 B1 | 12/2005 | Beyer et al. |
| 7,072,863 B1 | 7/2006 | Phillips et al. |
| 7,080,026 B2 | 7/2006 | Singh et al. |
| 7,103,222 B2 | 9/2006 | Peker |
| 7,130,822 B1 | 10/2006 | Their et al. |
| 7,130,833 B2 | 10/2006 | Kashima et al. |
| 7,171,340 B2 | 1/2007 | Brocklebank |
| 7,194,434 B2 | 3/2007 | Piccioli |
| 7,216,088 B1 | 5/2007 | Chappel et al. |
| 7,222,082 B1 | 5/2007 | Adhikari et al. |
| 7,236,940 B2 | 6/2007 | Chappel |
| 7,240,019 B2 | 7/2007 | Delurgio et al. |
| 7,251,589 B1 | 7/2007 | Crowe et al. |
| 7,260,550 B1 | 8/2007 | Notani |
| 7,280,986 B2 | 10/2007 | Goldberg et al. |
| 7,433,834 B2 | 10/2008 | Joao |
| 7,523,048 B1 | 4/2009 | Dvorak |
| 7,530,025 B2 | 5/2009 | Ramarajan et al. |
| 7,562,062 B2 | 7/2009 | Ladde et al. |
| 7,565,417 B2 | 7/2009 | Rowady, Jr. |
| 7,570,262 B2 | 8/2009 | Landau et al. |
| 7,610,214 B1 | 10/2009 | Dwarakanath et al. |
| 7,617,167 B2 | 11/2009 | Griffis et al. |
| 7,660,734 B1 | 2/2010 | Neal et al. |
| 7,689,456 B2 | 3/2010 | Schroeder et al. |
| 7,693,737 B2 | 4/2010 | Their et al. |
| 7,702,482 B2 | 4/2010 | Graepel et al. |
| 7,711,734 B2 | 5/2010 | Leonard et al. |
| 7,716,022 B1 | 5/2010 | Park et al. |
| 7,987,106 B1 | 7/2011 | Aykin |
| 8,005,707 B1 | 8/2011 | Jackson et al. |
| 8,010,324 B1 | 8/2011 | Crowe et al. |
| 8,010,404 B1 | 8/2011 | Wu et al. |
| 8,326,677 B1 | 12/2012 | Fan et al. |
| 8,631,040 B2 | 1/2014 | Jackson et al. |
| 9,037,998 B2 | 5/2015 | Leonard et al. |
| 9,087,306 B2 | 7/2015 | Leonard et al. |
| 9,147,218 B2 | 9/2015 | Leonard et al. |
| 9,244,887 B2 | 1/2016 | Leonard et al. |
| 9,916,282 B2 * | 3/2018 | Leonard .................. G06F 17/10 |
| 2001/0013008 A1 | 8/2001 | Waclawski |
| 2002/0052758 A1 | 5/2002 | Arthur et al. |
| 2002/0169657 A1 | 11/2002 | Singh et al. |
| 2003/0101009 A1 | 5/2003 | Seem |
| 2003/0105660 A1 | 6/2003 | Walsh et al. |
| 2003/0110016 A1 | 6/2003 | Stefek et al. |
| 2003/0154144 A1 | 8/2003 | Pokorny et al. |
| 2003/0187719 A1 | 10/2003 | Brocklebank |
| 2003/0200134 A1 | 10/2003 | Leonard et al. |
| 2003/0212590 A1 | 11/2003 | Klingler |
| 2004/0041727 A1 | 3/2004 | Ishii et al. |
| 2004/0172225 A1 | 9/2004 | Hochberg et al. |
| 2005/0055275 A1 | 3/2005 | Newman et al. |
| 2005/0102107 A1 | 5/2005 | Porikli |
| 2005/0114391 A1 | 5/2005 | Corcoran et al. |
| 2005/0159997 A1 | 7/2005 | John |
| 2005/0177351 A1 | 8/2005 | Goldberg et al. |
| 2005/0209732 A1 | 9/2005 | Audimoolam et al. |
| 2005/0249412 A1 | 11/2005 | Radhakrishnan et al. |
| 2005/0271156 A1 | 12/2005 | Nakano |
| 2006/0063156 A1 | 3/2006 | Willman et al. |
| 2006/0064181 A1 | 3/2006 | Kato |
| 2006/0085380 A1 | 4/2006 | Cote et al. |
| 2006/0112028 A1 | 5/2006 | Xiao et al. |
| 2006/0143081 A1 | 6/2006 | Argaiz |
| 2006/0164997 A1 | 7/2006 | Graepel et al. |
| 2006/0241923 A1 | 10/2006 | Xu et al. |
| 2006/0247859 A1 | 11/2006 | Ladde et al. |
| 2006/0247900 A1 | 11/2006 | Brocklebank |
| 2007/0011175 A1 | 1/2007 | Langseth et al. |
| 2007/0094168 A1 | 4/2007 | Ayala et al. |
| 2007/0106550 A1 | 5/2007 | Umblijs et al. |
| 2007/0118491 A1 | 5/2007 | Baum et al. |
| 2007/0162301 A1 | 7/2007 | Sussman et al. |
| 2007/0203783 A1 | 8/2007 | Beltramo |
| 2007/0208492 A1 | 9/2007 | Downs et al. |
| 2007/0208608 A1 | 9/2007 | Amerasinghe et al. |
| 2007/0291958 A1 | 12/2007 | Jehan |
| 2008/0097802 A1 | 4/2008 | Ladde et al. |
| 2008/0208832 A1 | 8/2008 | Friedlander et al. |
| 2008/0288537 A1 | 11/2008 | Golovchinsky et al. |
| 2008/0294651 A1 | 11/2008 | Masuyama et al. |
| 2009/0018996 A1 | 1/2009 | Hunt et al. |
| 2009/0172035 A1 | 7/2009 | Lessing et al. |
| 2009/0319310 A1 | 12/2009 | Little |
| 2010/0030521 A1 | 2/2010 | Akhrarov et al. |
| 2010/0063974 A1 | 3/2010 | Papadimitriou et al. |
| 2010/0114899 A1 | 5/2010 | Guha et al. |
| 2010/0257133 A1 | 10/2010 | Crowe et al. |
| 2011/0119374 A1 | 5/2011 | Ruhl et al. |
| 2011/0145223 A1 | 6/2011 | Cormode et al. |
| 2011/0208701 A1 | 8/2011 | Jackson et al. |
| 2011/0307503 A1 | 12/2011 | Dlugosch |
| 2012/0053989 A1 | 3/2012 | Richard |
| 2013/0024167 A1 | 1/2013 | Blair et al. |
| 2013/0024173 A1 | 1/2013 | Brzezicki et al. |
| 2013/0268318 A1 | 10/2013 | Richard |
| 2014/0019088 A1 | 1/2014 | Leonard et al. |
| 2014/0019448 A1 | 1/2014 | Leonard et al. |

(56) References Cited

U.S. PATENT DOCUMENTS

2014/0019909 A1 1/2014 Leonard et al.
2014/0257778 A1 9/2014 Leonard et al.
2015/0120263 A1 4/2015 Brzezicki et al.

OTHER PUBLICATIONS

Automatic Forecasting Systems Inc., Autobox 5.0 for Windows User's Guide, 82 pp. (1999).
Choudhury, J. Paul et al., "Forecasting of Engineering Manpower Through Fuzzy Associative Memory Neural Network with ARIMA: A Comparative Study", Neurocomputing, vol. 47, Iss. 1-4, pp. 241-257 (Aug. 2002).
Costantini, Mauro et al., "Forecast Combination Based on Multiple Encompassing Tests in a Macroeconomic DSGE System," Reihe Okonomie/ Economics Series 251, 24 pp. (May 2010).
Data Mining Group, available at http://www.dmg.org, printed May 9, 2005, 3 pp.
Funnel Web, Web site Analysis. Report, Funnel Web Demonstration, Authenticated Users History, http://www.quest.com/funnel.sub.--web/analyzer/sample/UserHist.html (1 pg.), Mar. 2002.
Funnel Web, Web site Analysis Report, Funnel Web Demonstration, Clients History, http://www/quest.com/funnel.sub.--web/analyzer/sample.ClientHist- .html (2 pp.), Mar. 2002.
Garavaglia, Susan et al., "A Smart Guide to Dummy Variables: Four Applications and a Macro," accessed from: http://web.archive.org/web/20040728083413/http://www.ats.ucla.edu/stat/sa- s/library/nesug98/p046.pdf, (2004).
Guerard John B. Jr., Automatic Time Series Modeling, Intervention Analysis, and Effective Forecasting. (1989) Journal of Statistical Computation and Simulation, 1563-5163, vol. 34, Issue 1, pp. 43-49.
Guralnik, V. and Srivastava, J., Event Detection from Time Series Data (1999), Proceedings of the 5th ACM SIGKDD International Conference on Knowledge Discovery and Data Mining, pp. 33-42.
Harrison, H.C. et al., "An Intelligent Business Forecasting System", ACM Annual Computer Science Conference, pp. 229-236 (1993).
Harvey, Andrew, "Forecasting with Unobserved Components Time Series Models," Faculty of Economics, University of Cambridge, Prepared for Handbook of Economic Forecasting, pp. 1-89 (Jul. 2004).
Jacobsen, Erik et al., "Assigning Confidence to Conditional Branch Predictions", IEEE, Proceedings of the 29th Annual International Symposium on Microarchitecture, 12 pp. (Dec. 2-4, 1996).
Keogh, Eamonn J. et al., "Derivative Dynamic Time Warping", In First SIAM International Conference on Data Mining (SDM'2001), Chicago, USA, pp. 1-11 (2001).
Kobbacy, Khairy A.H., et al., Abstract, "Towards the development of an intelligent inventory management system," Integrated Manufacturing Systems, vol. 10, Issue 6, (1999) 11 pp.
Kumar, Mahesh, "Combining Forecasts Using Clustering", Rutcor Research Report 40/2005, cover page and pp. 1-16 (Dec. 2005).
Leonard, Michael et al., "Mining Transactional and Time Series Data", abstract and presentation, International Symposium of Forecasting, 23 pp. (2003).
Leonard, Michael et al., "Mining Transactional and Time Series Data", abstract, presentation and paper, SUGI, 142 pp. (Apr. 10-13, 2005).
Leonard, Michael, "Large-Scale Automatic Forecasting Using Inputs and Calendar Events", abstract and presentation, International Symposium on Forecasting Conference, 56 pp. (Jul. 4-7, 2004).
Leonard, Michael, "Large-Scale Automatic Forecasting Using Inputs and Calendar Events", White Paper, pp. 1-27 (2005).
Leonard, Michael, "Large-Scale Automatic Forecasting: Millions of Forecasts", abstract and presentation, International Symposium of Forecasting, 156 pp. (2002).
Leonard, Michael, "Predictive Modeling Markup Language for Time Series Models", abstract and presentation, International Symposium on Forecasting Conference, 35 pp. (Jul. 4-7, 2004).
Leonard, Michael, "Promotional Analysis and Forecasting for Demand Planning: A Practical Time Series Approach", with exhibits 1 and 2, SAS Institute Inc., Cary, North Carolina, 50 pp. (2000).
Lu, Sheng et al., "A New Algorithm for Linear and Nonlinear ARMA Model Parameter Estimation Using Affine Geometry", IEEE Transactions on Biomedical Engineering, vol. 48, No. 10, pp. 1116-1124 (Oct. 2001).
Malhotra, Manoj K. et al., "Decision making using multiple models", European Journal of Operational Research, 114, pp. 1-14 (1999).
McQuarrie, Allan D.R. et al., "Regression and Time Series Model Selection", World Scientific Publishing Co. Pte. Ltd., 40 pp. (1998).
Oates, Tim et al., "Clustering Time Series with Hidden Markov Models and Dynamic Time Warping", Computer Science Department, LGRC University of Massachusetts, In Proceedings of the IJCAI-99, 5 pp. (1999).
Park, Kwan Hee, Abstract "Development and evaluation of a prototype expert system for forecasting models", Mississippi State University, 1990, 1 pg.
Product Brochure, Forecast PRO, 2000, 12 pp.
Quest Software, "Funnel Web Analyzer: Analyzing the Way Visitors Interact with Your Web Site", http://www.quest.com/funnel.sub.--web/analyzer (2 pp.), Mar. 2002.
Safavi, Alex "Choosing the right forecasting software and system. " The Journal of Business Forecasting Methods & Systems 19.3 (2000): 6-10. ABI/INFORM Global, ProQuest.
SAS Institute Inc., SAS/ETS User's Guide, Version 8, Cary NC; SAS Institute Inc., (1999) 1543 pages.
Seasonal Dummy Variables, Mar. 2004, http://shazam.econ.ubc.ca/intro/dumseas.htm, Accessed from: http://web.archive.org/web/20040321055948/http://shazam.econ.ubc.ca/intro- /dumseas.htm.
Simoncelli, Eero, "Least Squares Optimization," Center for Neural Science, and Courant Institute of Mathematical Sciences, pp. 1-8 (Mar. 9, 2005).
Tashman, Leonard J. et al., Abstract "Automatic Forecasting Software: A Survey and Evaluation", International Journal of Forecasting, vol. 7, Issue 2, Aug. 1991, 1 pg.
Using Predictor Variables, (1999) SAS OnlineDoc: Version 8, pp. 1325-1349, Accessed from: http://www.okstate.edu/sas/v8/saspdf/ets/chap27.pdf.
van Wijk, Jarke J. et al., "Cluster and Calendar based Visualization of Time Series Data", IEEE Symposium on Information Visualization (INFOVIS '99), San Francisco, pp. 1-6 (Oct. 25-26, 1999).
Vanderplaats, Garret N., "Numerical Optimization Techniques for Engineering Design", Vanderplaats Research & Development (publisher), Third Edition, 18 pp. (1999).
Wang, Liang et al., "An Expert System for Forecasting Model Selection", IEEE, pp. 704-709 (1992).
Atuk, Oguz et al., "Seasonal Adjustment in Economic Time Series," Statistics Department, Discussion Paper No. 2002/1, Central Bank of the Republic of Turkey, Central Bank Review, 15 pp. (2002).
Babu, G., "Clustering in non-stationary environments using a clan-based evolutionary approach," Biological Cybernetics, Sep. 7, 1995, Springer Berlin I Heidelberg, pp. 367-374, vol. 73, Issue: 4.
Bruno, Giancarlo et al., "The Choice of Time Intervals in Seasonal Adjustment: A Heuristic Approach," Institute for Studies and Economic Analysis, Rome Italy, 14 pp. (2004).
Bruno, Giancarlo et al., "The Choice of Time Intervals in Seasonal Adjustment: Characterization and Tools," Institute for Studies and Economic Analysis, Rome, Italy, 21 pp. (Jul. 2001).
Bradley, D.C. et al., "Quantitation of measurement error with Optimal Segments: basis for adaptive time course smoothing," Am J Physiol Endocrinol Metab Jun. 1, 1993 264:(6) E902-E911.
Huang, N. E. et al.,"Applications of Hilbert-Huang transform to non-stationary financial time series analysis." Appl. Stochastic Models Bus. Ind., 19: 245-268 (2003).
IBM, "IBM Systems, IBM PowerExecutive Installation and User's Guide," Version 2.10, 62 pp. (Aug. 2007).

(56) References Cited

OTHER PUBLICATIONS

Kalpakis, K. et al., "Distance measures for effective clustering of ARIMA time-series," Data Mining, 2001. ICDM 2001, Proceedings IEEE International Conference on, vol., No., pp. 273-280, 2001.
Keogh, E. et al., "An online algorithm for segmenting time series," Data Mining, 2001. ICDM 2001, Proceedings IEEE International Conference on , vol., No., pp. 289-296, 2001.
Keogh, Eamonn et al., "Segmenting Time Series: A Survey and Novel Approach," Department of Information and Computer Science, University of California, Irvine, California 92697, 15 pp. (2004).
Palpanas, T. et al., "Online amnesic approximation of streaming time series," Data Engineering, 2004. Proceedings. 20th International Conference on , vol., No., pp. 339-349, Mar. 30-Apr. 2, 2004.
Wang Xiao-Ye; Wang Zheng-Ou; "A structure-adaptive piece-wise linear segments representation for time series," Information Reuse and Integration, 2004. IR I 2004. Proceedings of the 2004 IEEE International Conference on , vol., No., pp. 433-437, Nov. 8-10, 2004.
Yu, Lean et al., "Time Series Forecasting with Multiple Candidate Models: Selecting or Combining?" Journal of System Science and Complexity, vol. 18, No. 1, pp. 1-18 (Jan. 2005).
Non-Final Office Action dated Aug. 29, 2012 for U.S. Appl. No. 13/031,828, 18 pages.
Non-Final Office Action dated Oct. 31, 2007 for U.S. Appl. No. 10/402,849, 14 pages.
Final Office Action dated May 21, 2008 for U.S. Appl. No. 10/402,849, 19 pages.
Non-Final Office Action dated Feb. 20, 2009 for U.S. Appl. No. 10/402,849, 21 pages.
Final Office Action dated Jul. 1, 2010 for U.S. App. No. 10/402,849, 24 pages.
Non-Final Office Action dated Aug. 30, 2013 for U.S. Appl. No. 10/402,849, 29 pages.
Notice of Allowance dated Sep. 16, 2013 for U.S. Appl. No. 13/031,828 17 pages.
Non-Final Office Action dated Oct. 25, 2013 for U.S. Appl. No. 13/189,131, 37 pages.
Non-Final Office Action dated Jan. 16, 2014 for U.S. Appl. No. 13/440,045, 12 pages.
Non-Final Office Action dated Mar. 26, 2014 for U.S. Appl. No. 13/548,282, 40 pages.
Final Office Action dated Apr. 24, 2014 for U.S. Appl. No. 13/189,131, 30 pages.
Non-Final Office Action dated Aug. 8, 2014 for U.S. Appl. No. 10/402,849, 29 pages.
Notice of Allowance dated Aug. 29, 2014 for U.S. Appl. No. 13/440,045, 9 pages.
Final Office Action dated Oct. 24, 2014 for U.S. Appl. No. 13/548,282, 30 pages.
Notice of Allowance dated Jan. 14, 2015 for U.S. Appl. No. 13/551,647 8 pages.
Notice of Allowance dated Mar. 13, 2015 for U.S. Appl. No. 13/548,307, 9 pages.
Notice of Allowance dated May 8, 2015 for U.S. Appl. No. 13/786,838, 6 pagers.
Non-Final Office Action dated May 22, 2015 for U.S. Appl. No. 10/402,849, 32 pages.
Non-Final Office Action dated Aug. 17, 2015 for U.S. Appl. No. 13/189,131, 11 pages.
Notice of Allowance dated Sep. 29, 2015 for U.S. Appl. No. 13/548,282, 10 pages.
Final Office Action dated Nov. 17, 2015 for U.S. Appl. No. 10/402,849, 31 pages.
Non-Final Office Action dated Mar. 1, 2016 for U.S. Appl. No. 13/189,131, 6 pages.
First Action Interview Pilot Program Pre-Interview Communication dated Aug. 18, 2017, for U.S. Appl. No. 14/736,131, 4 pages.
Notice of Allowance dated Nov. 22, 2017 for U.S. Appl. No. 14/736,131, 11 pages.

\* cited by examiner

COMPUTER-IMPLEMENTED SYSTEMS AND METHODS FOR TIME SERIES EXPLORATION

CROSS-REFERENCE TO RELATED APPLICATIONS

This application is a continuation of U.S. patent application Ser. No. 14/736,131 filed Jun. 10, 2015 which is a continuation of U.S. patent application Ser. No. 13/548,307, filed Jul. 13, 2012, which are incorporated herein by reference in their entirety for all purposes.

TECHNICAL FIELD

This document relates generally to time series analysis, and more particularly to structuring unstructured time series data into a hierarchical structure.

BACKGROUND

Many organizations collect large amounts of transactional and time series data related to activities, such as time stamped data associated with physical processes, such as product manufacturing or product sales. These large data sets may come in a variety of forms and often originate in an unstructured form that may include only a collection of data records having data values and accompanying time stamps.

Organizations often wish to perform different types of time series analysis on their collected data sets. However, certain time series analysis operators (e.g., a predictive data model for forecasting product demand) may be configured to operate on hierarchically organized time series data. Because an organization's unstructured time stamped data sets are not properly configured, the desired time series analysis operators are not able to properly operate on the organization's unstructured data sets.

SUMMARY

In accordance with the teachings herein, systems and methods are provided for analyzing unstructured time stamped data of a physical process in order to generate structured hierarchical data for a hierarchical time series analysis application. A plurality of time series analysis functions are selected from a functions repository. Distributions of time stamped unstructured data are analyzed to identify a plurality of potential hierarchical structures for the unstructured data with respect to the selected time series analysis functions. Different recommendations for the potential hierarchical structures for each of the selected time series analysis functions are provided, where the selected time series analysis functions affect what types of recommendations are to be provided, and the unstructured data is structured into a hierarchical structure according to one or more of the recommended hierarchical structures, where the structured hierarchical data is provided to an application for analysis using one or more of the selected time series analysis functions.

As another example, a system for analyzing unstructured time stamped data of a physical process in order to generate structured hierarchical data for a hierarchical time series analysis application includes one or more processors and one or more computer-readable storage mediums containing instructions configured to cause the one or more processors to perform operations. In those operations, a plurality of time series analysis functions are selected from a functions repository. Distributions of time stamped unstructured data are analyzed to identify a plurality of potential hierarchical structures for the unstructured data with respect to the selected time series analysis functions. Different recommendations for the potential hierarchical structures for each of the selected time series analysis functions are provided, where the selected time series analysis functions affect what types of recommendations are to be provided, and the unstructured data is structured into a hierarchical structure according to one or more of the recommended hierarchical structures, where the structured hierarchical data is provided to an application.

As a further example, a computer program product for analyzing unstructured time stamped data of a physical process in order to generate structured hierarchical data for a hierarchical time series analysis application, tangibly embodied in a machine-readable non-transitory storage medium, includes instructions configured to cause a data processing system to perform a method. In the method, a plurality of time series analysis functions are selected from a functions repository. Distributions of time stamped unstructured data are analyzed to identify a plurality of potential hierarchical structures for the unstructured data with respect to the selected time series analysis functions. Different recommendations for the potential hierarchical structures for each of the selected time series analysis functions are provided, where the selected time series analysis functions affect what types of recommendations are to be provided, and the unstructured data is structured into a hierarchical structure according to one or more of the recommended hierarchical structures, where the structured hierarchical data is provided to an application.

DETAILED DESCRIPTION

Figure 1:
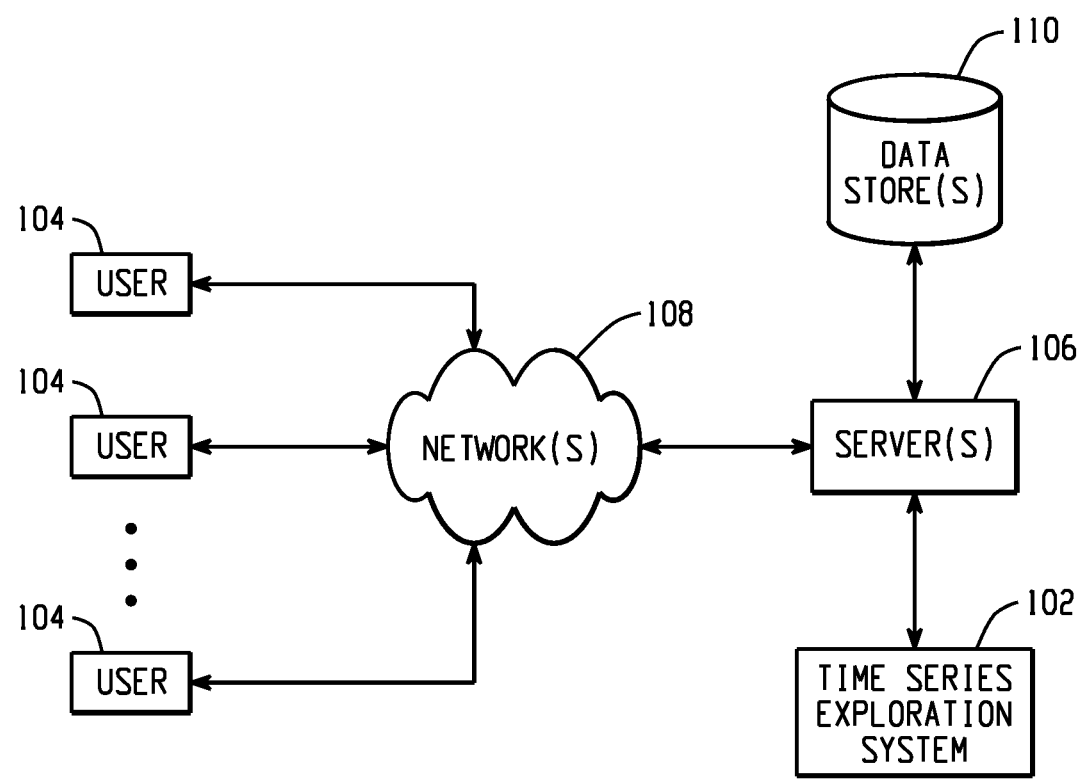
FIG. 1 is a block diagram depicting a computer-implemented time series exploration system.

FIG. 1 is a block diagram depicting a computer-implemented time series exploration system. A time series exploration system 102 facilitates the analysis of unstructured time stamped data, such as data related to a physical process, in order to generate structured hierarchical time series data for a hierarchical time series application. For example, the time series exploration system 102 may receive unstructured (e.g., raw time stamped) data from a variety of sources, such as product manufacturing or product sales databases (e.g., a database containing individual data records identifying details of individual product sales that includes a date and time of each of the sales). The unstructured data may be presented to the time series exploration system 102 in different forms such as a flat file or a conglomerate of data records having data values and accompanying time stamps. The time series exploration system 102 can be used to analyze the unstructured data in a variety of ways to determine the best way to hierarchically structure that data, such that the hierarchically structured data is tailored to a type of further analysis that a user wishes to perform on the data. For example, the unstructured time stamped data may be aggregated by a selected time period (e.g., into daily time period units) to generate time series data and structured hierarchically according to one or more dimensions (attributes, variables). Data may be stored in a hierarchical data structure, such as a MOLAP database, or may be stored in another tabular form, such as in a flat-hierarchy form.

The time series exploration system 102 can facilitate interactive exploration of unstructured time series data. The system 102 can enable interactive structuring of the time series data from multiple hierarchical and frequency perspectives. The unstructured data can be interactively queried or subset using hierarchical queries, graphical queries, filtering queries, or manual selection. Given a target series, the unstructured data can be interactively searched for similar series or cluster panels of series. After acquiring time series data of interest from the unstructured data, the time series data can be analyzed using statistical time series analysis techniques for univariate (e.g., autocorrelation operations, decomposition analysis operations), panel, and multivariate time series data. After determining patterns in selected time series data, the time series data can be exported for subsequent analysis, such as forecasting, econometric analysis, pricing analysis, risk analysis, time series mining, as well as others.

Users 104 can interact with a time series exploration system 102 in a variety of ways. For example, FIG. 1 depicts at an environment wherein users 104 can interact with a time series exploration system 104 hosted on one or more servers 106 through a network 108. The time series exploration system 102 may analyze unstructured time stamped data of a physical process to generate structured hierarchical data for a hierarchical time series analysis application. The time series exploration system 102 may perform such analysis by accessing data, such as time series analysis functions and unstructured time stamped data, from a data store 110 that is responsive to the one or more servers 106.

Figure 2:
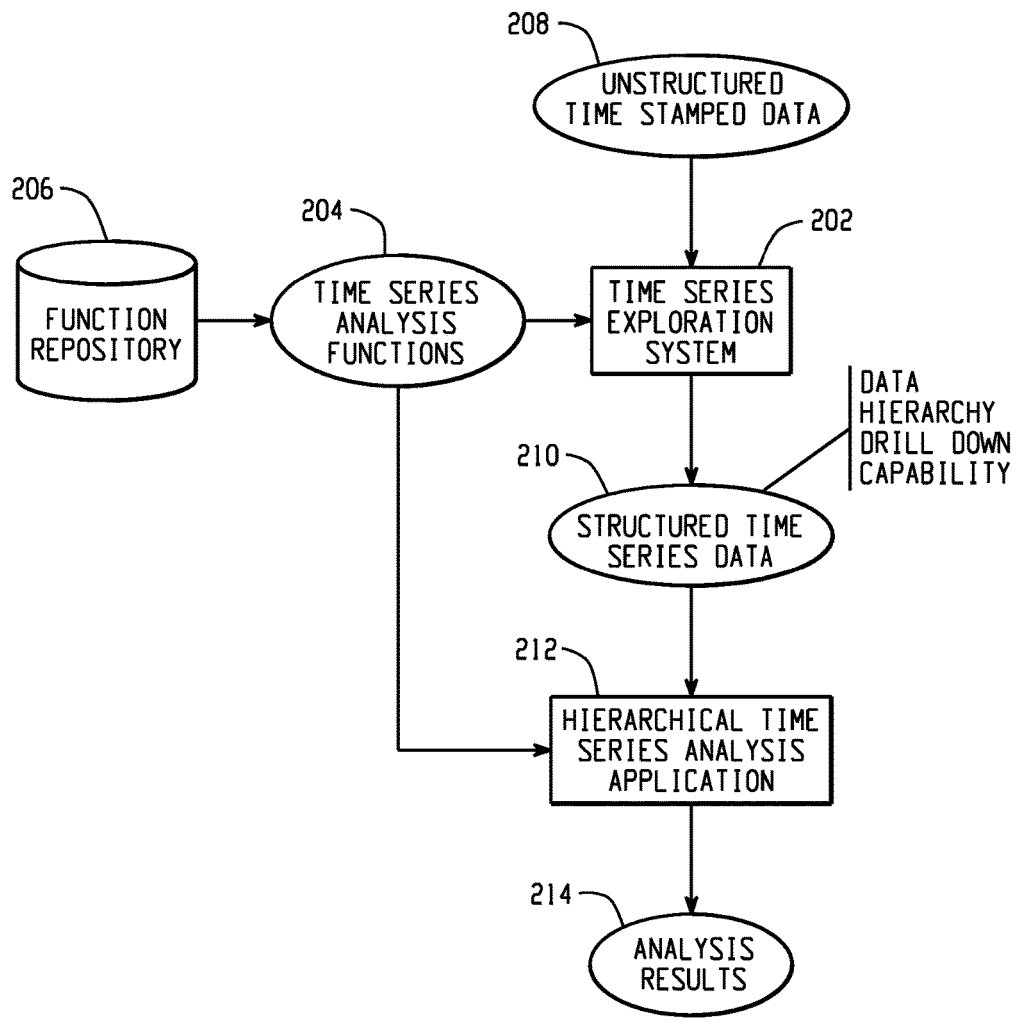
FIG. 2 is a block diagram depicting a time series exploration system configured to perform a method of analyzing unstructured hierarchical data for a hierarchical time series analysis application.

FIG. 2 is a block diagram depicting a time series exploration system configured to perform a method of analyzing unstructured hierarchical data for a hierarchical time series analysis application. The time series exploration system 202 receives a selection of one or more time series analysis functions 204, such as time series analysis functions 204 that are customizable by a user that are stored in a function repository 206. The time series exploration system 202 accesses unstructured time-stamped data 208 and analyzes distributions of the unstructured time stamped data 208 to identify a plurality of potential hierarchical structures for the unstructured data with respect to the selected time series analysis functions (e.g., a selected function utilizes data according to item type and regions, and the system suggests a hierarchy including item type and region attributes (dimensions) as levels). The time series exploration system uses those potential hierarchical structures to provide different recommendations of which potential hierarchical structures are best suited according to selected time series analysis functions 204. The unstructured data 208 is structured into a hierarchical structure according to one or more of the recommended hierarchical structures (e.g., an automatically selected potential hierarchical structure, a potential hierarchical structure selected by a user) to form structured time series data 210. Such structured time series data 210 can be explored and otherwise manipulated by a time series exploration system 202, such as via data hierarchy drill down exploration capabilities, clustering operations, or search operations, such as a faceted search where data is explored across one or multiple hierarchies by applying multiple filters across multiple dimensions, where such filters can be added or removed dynamically based on user manipulation of a GUI. The structured time series data 210 is provided to a hierarchical time series analysis application 212 for analysis using one or more of the selected time series analysis functions 204 to generate analysis results 214. Such results 214 may also be in a hierarchical form such that drill down and other data exploration operations may be performed on the analysis results 214.

Figure 3:
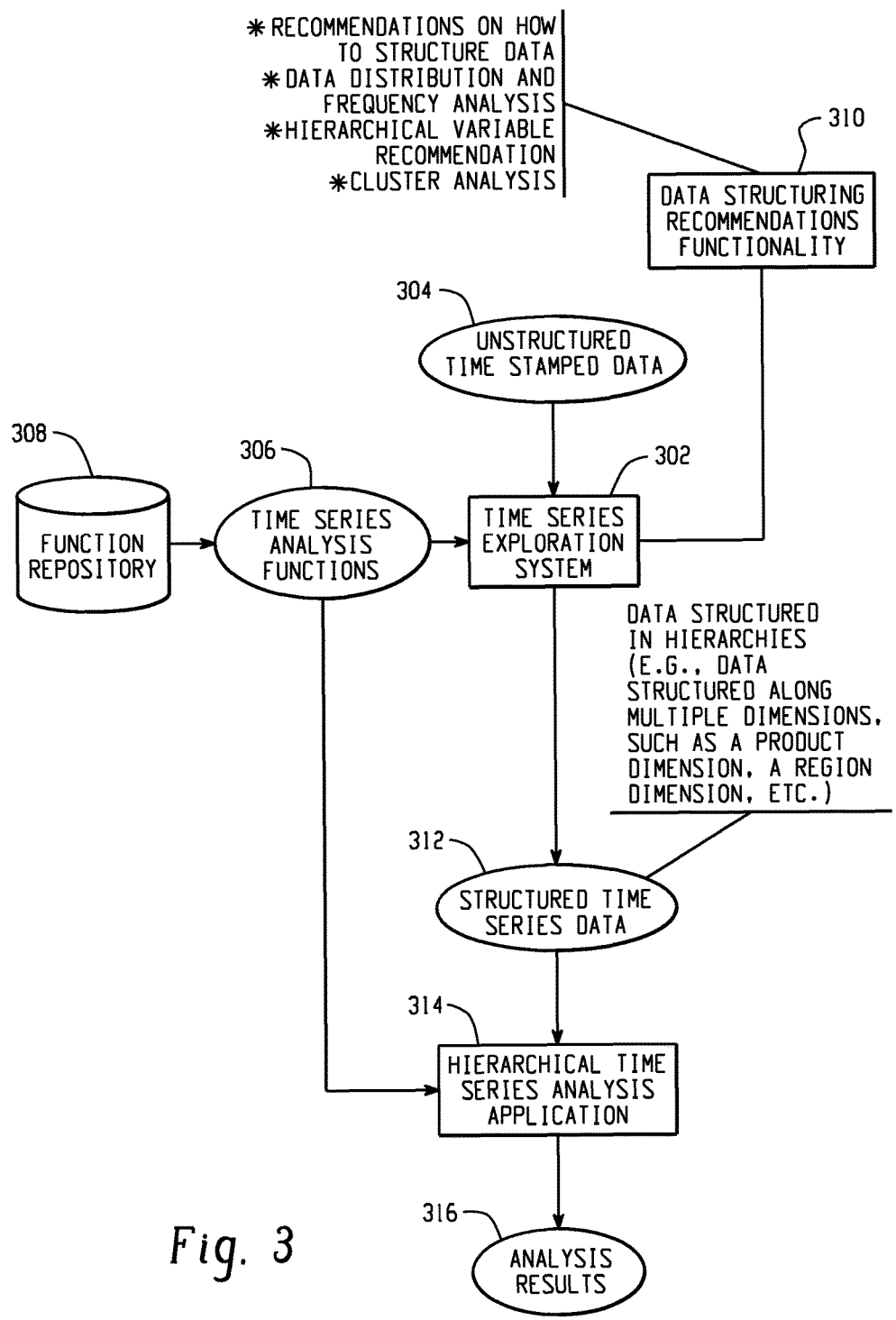
FIG. 3 is a block diagram depicting data structuring recommendation functionality.

FIG. 3 is a block diagram depicting data structuring recommendation functionality. A time series exploration system 302 receives unstructured time stamped data 304 to process as well as a selection of time series analysis functions 306 (e.g., from a function repository 308) to be applied to the unstructured time stamped data 304. The time series exploration system 302 analyzes the unstructured time stamped data 304 to provide recommendations as to how the unstructured time stamped data should be structured to result in a best application of the time series analysis functions. For example, the data structuring recommendations functionality 310 may perform certain data distribution, time domain frequency analysis, and time series data mining on the unstructured time stamped data 304 to provide a recommendation of a hierarchical structure and data aggregation frequency for structuring the data for analysis by a time series analysis function. Other data analysis techniques may be used by the data structuring recommendations functionality 310, such as cluster analysis (e.g., a proposed cluster structure is provided via a graphical interface, and a statistical analysis is performed on structured data that is structured according to the selected cluster structure).

Based on the recommendations made by the data structuring recommendations functionality, the unstructured time stamped data 304 is structured to form structured time series data 312. For example, the recommendation for a particular time series analysis function and set of unstructured time stamped data may dictate that the unstructured time stamped data be divided into a number of levels along multiple dimensions (e.g., unstructured time stamped data representing sales of products for a company may be structured into a product level and a region level). The recommendation may identify a segmentation of the time series data, where such a segmentation recommendations provides one or more options for dividing the data based on a criteria, such as a user defined criteria or a criteria based upon statistical analysis results. The recommendation may further identify an aggregation frequency (e.g., unstructured time stamped data may be aggregated at a monthly time period). The structured time series data 312 is then provided to a hierarchical time series analysis application 314, where a selected time series analysis 306 function is applied to the structured time series data 312 to generate analysis results 316 (e.g., a time slice analysis display of the structured data or analysis results).

Figure 4:
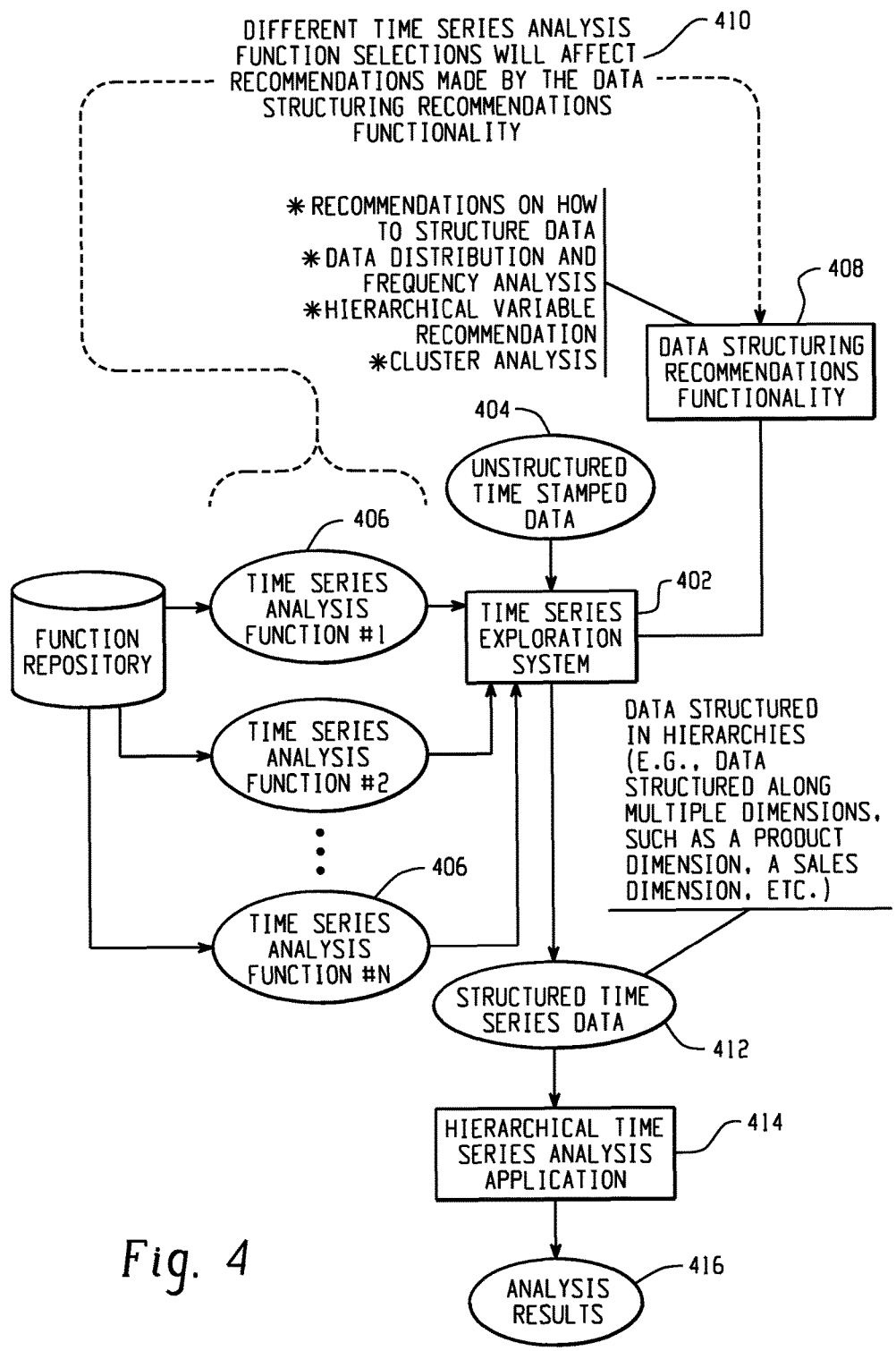
FIG. 4 is a block diagram depicting selection of different recommended potential hierarchical structures based on associated time series analysis functions.

FIG. 4 is a block diagram depicting selection of different recommended potential hierarchical structures based on associated time series analysis functions. A time series exploration system 402 receives unstructured time stamped data 404 as well as a number of time series analysis functions 406 to be performed on the unstructured time stamped data. Data structuring recommendations functionality 408 provides recommendations for structures for the unstructured time series data 404 and may also provide candidate aggregation frequencies. As indicated at 410, the time series analysis functions 406 that are selected can have an effect on the recommendations made by the data structuring recommendations functionality 408. For example, the data structuring recommendations functionality 408 may recommend that the unstructured time stamped data 404 be structured in a first hierarchy based on first dimensions at a first aggregation time period because such a structuring will enable a first time series analysis function to operate optimally (e.g., that first function will provide results in a fastest time, with a least number of memory accesses, with a least number of processing cycles). When the data structuring recommendations functionality 408 considers a second time series analysis function, the recommendations functionality 408 may recommend a second, different hierarchical structure and a second, different aggregation time period for the unstructured time stamped data 404 to benefit processing by the second time series analysis function.

Upon selection of a hierarchical structure and an aggregation frequency for a particular time series analysis function, the time series exploration system 402 structures the unstructured time stamped data 404 accordingly, to generate structured time series data 412. The structured time series data 412 is provided to a hierarchical time series analysis application 414 that applies the particular time series analysis function to the structured time series data 412 to generate analysis results 416.

Figure 5:
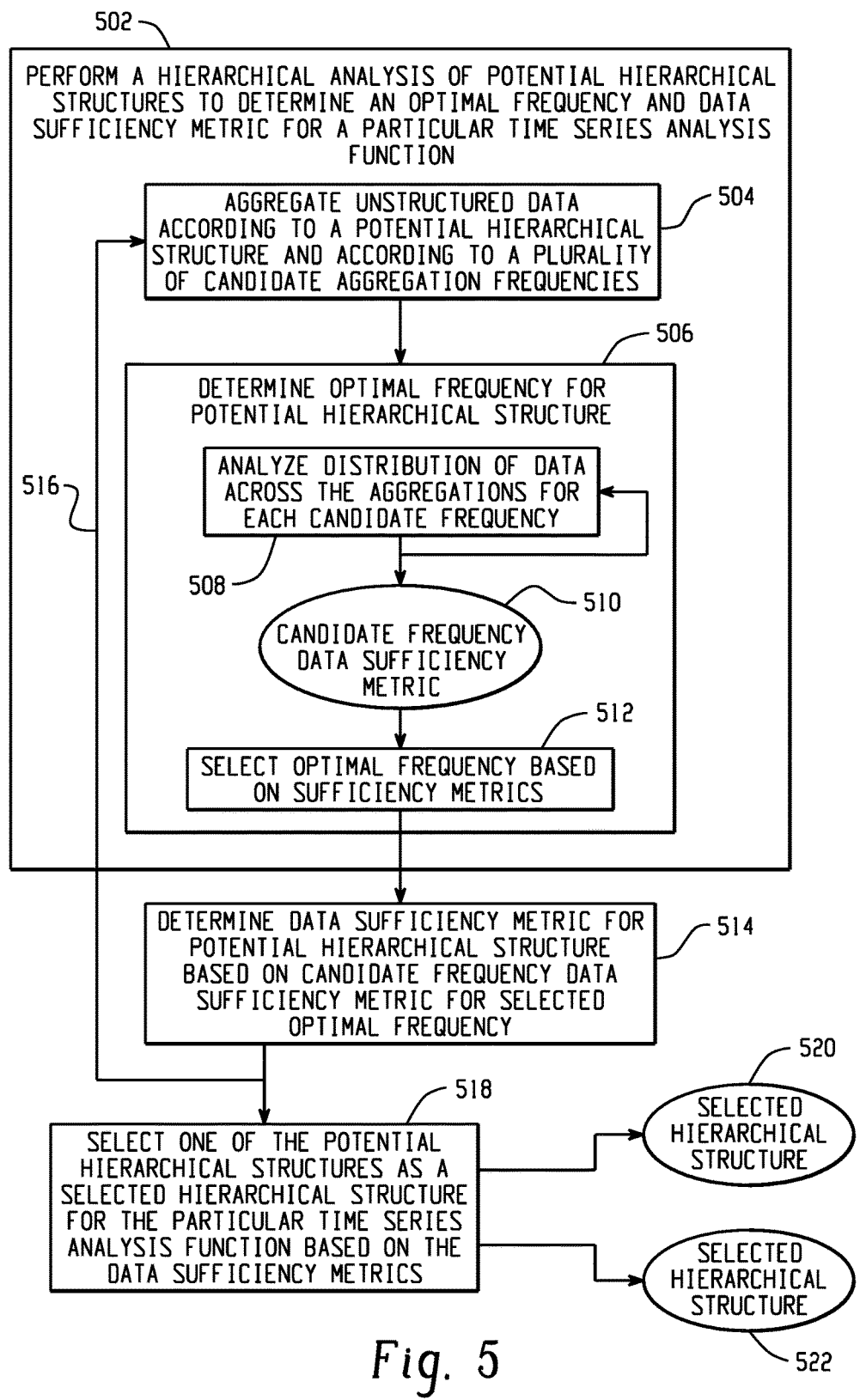
FIG. 5 is a flow diagram depicting performing a hierarchical analysis of the potential hierarchical structures.

FIG. 5 is a flow diagram depicting automatically performing a hierarchical analysis of the potential hierarchical structures for use with a particular time series analysis function. Performing the hierarchical analysis for a potential hierarchical structure 502 includes aggregating the unstructured data according to the potential hierarchical structure and according to a plurality of candidate frequencies 504. An optimal frequency for the potential hierarchical structure is determined at 506 by analyzing at 508 a distribution of data across the aggregations from 504 for each candidate frequency to determine a candidate frequency data sufficiency metric 510. The analysis at 508 is repeated for each of the candidate frequencies to generate a plurality of candidate frequency data sufficiency metrics. An optimal frequency for the potential hierarchical structure is selected at 512 based on the sufficiency metrics 510.

The data sufficiency metric 510 that is associated with the selected optimal frequency is used to determine a data sufficiency metric the potential hierarchical structure at 514. Thus, the data sufficiency metric of the best candidate frequency may be imputed to the potential hierarchical structure or otherwise used to calculate a sufficiency metric for the potential hierarchical structure, as the potential hierarchical structure will utilize the optimal frequency in downstream processing and comparison. The performing of the hierarchical analysis 502 to identify an optimal frequency for subsequent potential hierarchical structures is repeated, as indicated at 516. Once all of the potential hierarchical structures have been analyzed, a data structure includes an identification of the potential hierarchical structures, an optimal frequency associated with each of the potential hierarchical structures, and a data sufficiency metric associated with each of the potential hierarchical structures.

At 518, one of the potential hierarchical structures is selected as the selected hierarchical structure for the particular time series analysis function based on the data sufficiency metrics for the potential hierarchical structures. The selected hierarchical structure 520 and the associated selected aggregation frequency 522 can then be used to structure the unstructured data for use with the particular time series analysis function.

The structured time series data can be utilized by a time series analysis function in a variety of ways. For example, all or a portion of the structured time series data may be provided as an input to a predictive data model of the time series analysis function to generate forecasts of future events (e.g., sales of a product, profits for a company, costs for a project, the likelihood that an account has been compromised by fraudulent activity). In other examples, more advanced procedures may be performed. For example, the time series analysis may be used to segment the time series data. For instance, the structured hierarchical data may be compared to a sample time series of interest to identify a portion of the structured hierarchical data that is similar to the time series of interest. That identified similar portion of the structured hierarchical data may be extracted, and the time series analysis function operates on the extracted similar portion.

In another example, the structured hierarchical data is analyzed to identify a characteristic of the structured hierarchical data (e.g., a seasonal pattern, a trend pattern, a growth pattern, a delay pattern). A data model is selected for a selected time series analysis function based on the identified characteristic. The selected time series analysis function may then be performed using the selected data model. In a different example, the selected time series analysis function may perform a transformation or reduction on the structured hierarchical data and provide a visualization of the transformed or reduced data. In a further example, analyzing the distributions of the time-stamped unstructured data may include applying a user defined test or a business objective test to the unstructured time stamped data.

Figure 6:
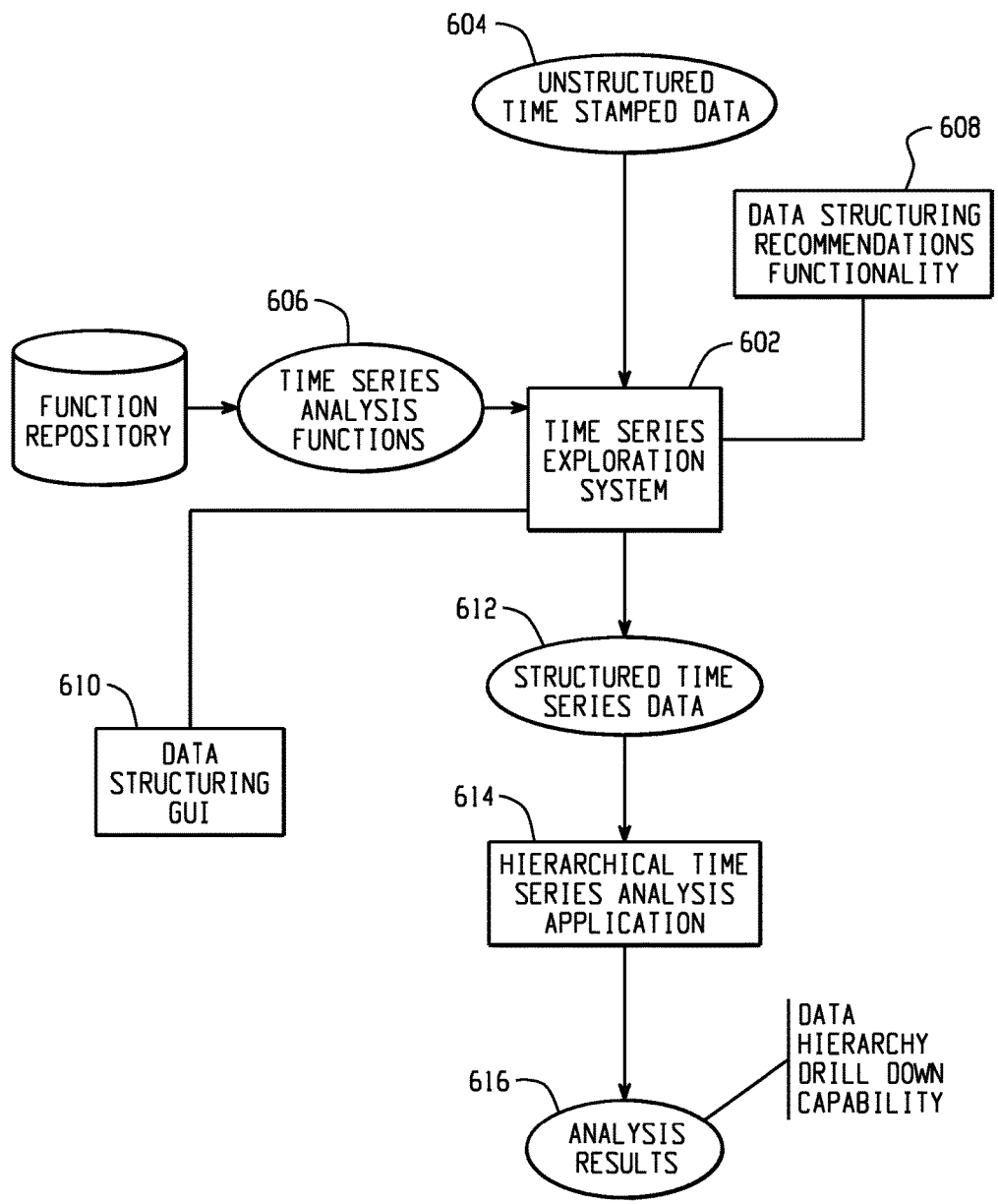
FIG. 6 is a block diagram depicting a data structuring graphical user interface (GUI) for incorporating human judgment into a data structuring operation.

Structuring unstructured time series data can be performed automatically (e.g., a computer system determines a hierarchical structure and aggregation frequency based on a set of unstructured time series data and an identified time series analysis function). Additionally, the process of structuring of the unstructured time series data may incorporate human judgment (e.g., structured judgment) at certain points or throughout. FIG. 6 is a block diagram depicting a data structuring graphical user interface (GUI) for incorporating human judgment into a data structuring operation. A time series exploration system 602 receives unstructured time stamped data 604 and a plurality of time series analysis functions 606. Based on time series analysis functions 606 that are selected, data structuring recommendations functionality 608 provides recommendations for ways to structure the unstructured time stamped data 604 for analysis by the time series analysis functions 606. A data structuring GUI 610 provides an interface for a user to provide input to the process. For example, the user may be provided with a number of recommendations for ways to structure the unstructured data 604 for analysis by a particular time series analysis function 606. The recommendations may include a metric that indicates how well each of the recommended structuring strategies is expected to perform when analyzed by the particular time series analysis function 606. The user can select one of the recommendations via the data structuring GUI 610, and the time series exploration system 602 structures the unstructured time stamped data 604 accordingly to produce structured time series data 612. The structured time series data 612 is provided to a hierarchical time series analysis application 614 that executes the particular time series analysis function 606 to generate analysis results 616.

Figure 7:
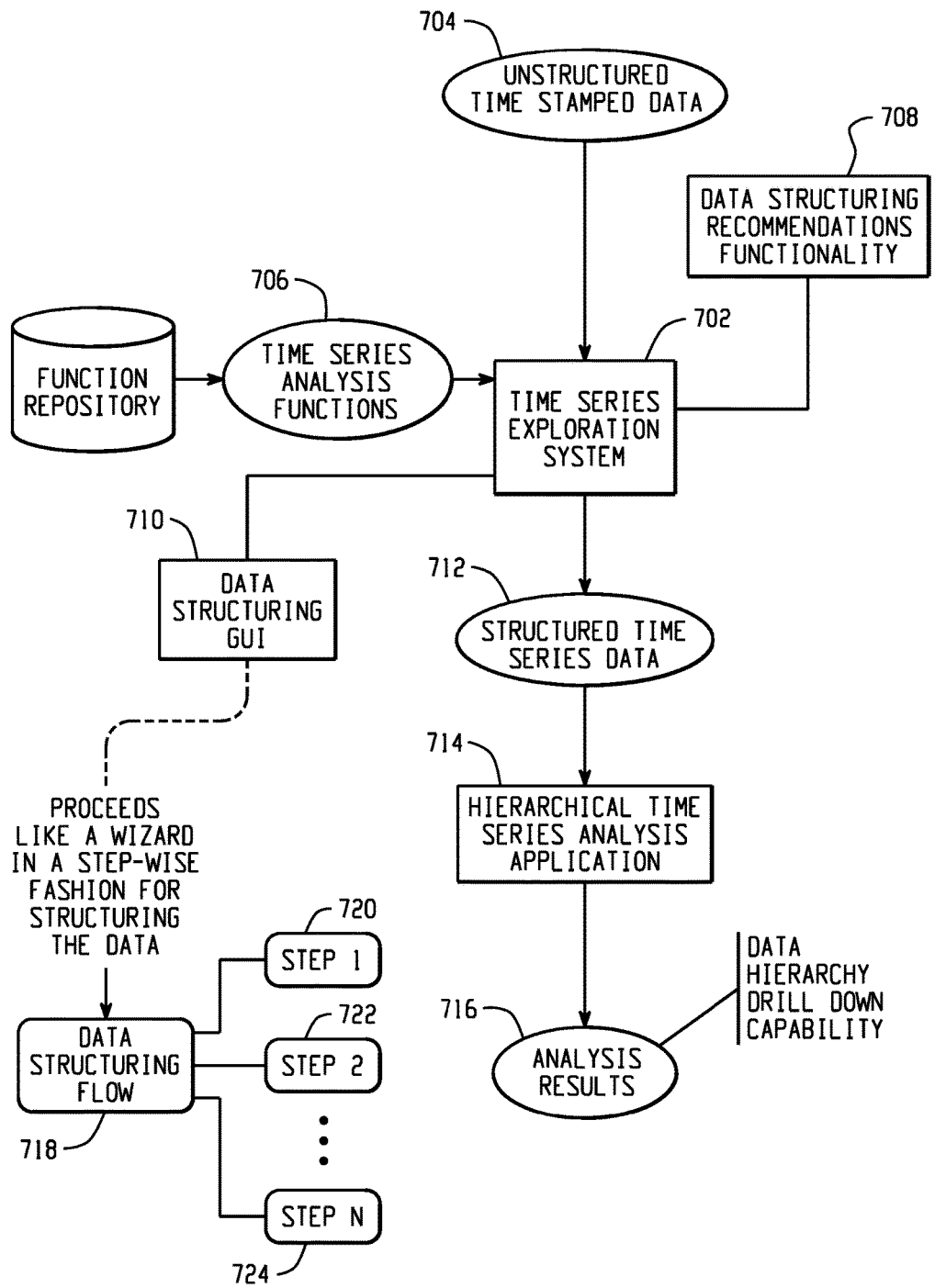
FIG. 7 is a block diagram depicting a wizard implementation of a data structuring GUI.

FIG. 7 is a block diagram depicting a wizard implementation of a data structuring GUI. A time series exploration system 702 accesses unstructured time stamped data 704 and one or more selected time series analysis functions 706. For example, a user may specify a location of unstructured time stamped data 704 and a selection of a time series analysis function 706 to be executed using the unstructured time stamped data 704. Data structuring recommendations functionality 708 may provide recommendations for potential hierarchical structures and/or aggregation time periods for the unstructured time stamped data 704 that might provide best results (e.g., fastest, most efficient) for the particular time series analysis function 706 identified by the user. A user may interact with the time series exploration system 702 via a data structuring GUI 710 to provide human judgment input into the selection of a hierarchical structure to be applied to the unstructured time stamped data 704 to generate the structured time series data 712 that is provided to a hierarchical time series analysis application 714 to generate analysis results 716 based on an execution of the selected time series analysis function 706. Additionally, the data structuring GUI 710 can facilitate a user specifying the structuring of the unstructured time stamped data 704 entirely manually, without recommendation from the data structuring recommendations functionality 708.

The data structuring GUI 710 may be formatted in a variety of ways. For example, the data structuring GUI 710 may be provided to a user in a wizard form, where the user is provided options for selection in a stepwise fashion 718. In one example, a user is provided a number of potential hierarchical structures for the unstructured time stamped data 704 from which to choose as a first step. In a second step 722, the user may be provided with a number of options for a data aggregation time period for the hierarchical structure selected at 720. Other steps 724 may provide displays for selecting additional options for generating the structured time series data 712.

Figure 8:
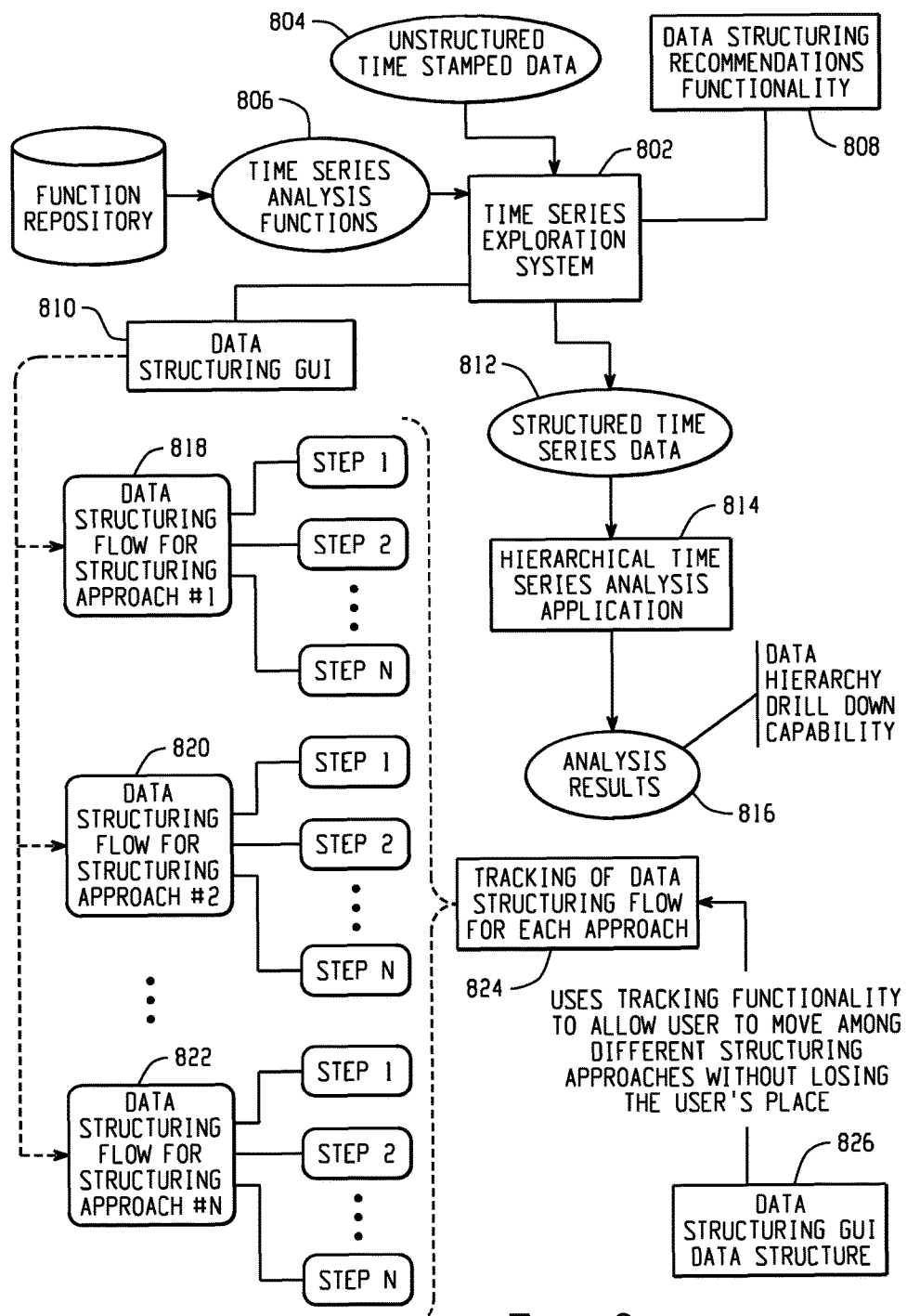
FIG. 8 is a block diagram depicting a data structuring GUI providing multiple data structuring process flows to a user for comparison.

FIG. 8 is a block diagram depicting a data structuring GUI providing multiple data structuring process flows to a user for comparison. A time series exploration system 802 receives unstructured time series data 804 and unstructured time stamped data 806 and provides recommendations 808 for structuring the unstructured time stamped data 804. A data structuring GUI 810 provides an interface for a user to provide input into the process of generating the structured time series data 812 that is provided to a hierarchical time series analysis application 814 to generate analysis results 816 based on an execution of a time series analysis function 806.

In the example of FIG. 8, the data structuring GUI 810 provides a plurality of data structuring flows 818, 820, 822 (e.g., wizard displays) for allowing a user to enter selections regarding structuring of the unstructured time stamped data 804. The data structuring flows 818, 820, 822 may be presented to the user serially or in parallel (e.g., in different windows). The user's selections in each of the data structuring flows 818, 820, 822 are tracked at 824 and stored in a data structure at 826 to allow a user to move among the different structuring approaches 818, 820, 822 without losing the user's place. Thus, the user can make certain selections (e.g., a first hierarchical structure) in a first data structuring flow 818 and see results of that decision (e.g., data distributions, data sufficiency metrics) and can make similar decisions (e.g., a second hierarchical structure) in a second data structuring flow 820 and see results of that decision. The user can switch between the results or compare metrics of the results to make a decision on a best course of action, as enabled by the tracking data 824 stored in the data structuring GUI data structure 826.

As an example, a computer-implemented method of using graphical user interfaces to analyze unstructured time stamped data of a physical process in order to generate structured hierarchical data for a hierarchical forecasting application may include a step of providing a first series of user display screens that are displayed through one or more graphical user interfaces, where the first series of user display screens are configured to be displayed in a step-wise manner so that a user can specify a first approach through a series of predetermined steps on how the unstructured data is to be structured. The information the user has specified in the first series of screens and where in the first series of user display screens the user is located is storing in a tracking data structure. A second series of user display screens are provided that are displayed through one or more graphical user interfaces, where the second series of user display screens are configured to be displayed in a step-wise manner so that the user can specify a second approach through the series of predetermined steps on how the unstructured data is to be structured. The information the user has specified in the second series of screens and where in the second series of user display screens the user is located is storing in the tracking data structure. Tracking data that is stored in the tracking data structure is used to facilitate the user going back and forth between the first and second series of user display screens without losing information or place in either the first or second user display screens, and the unstructured data is structured into a hierarchical structure based upon information provided by the user through the first or second series of user display screens, where the structured hierarchical data is provided to an application for analysis using one or more time series analysis functions.

Figure 9:
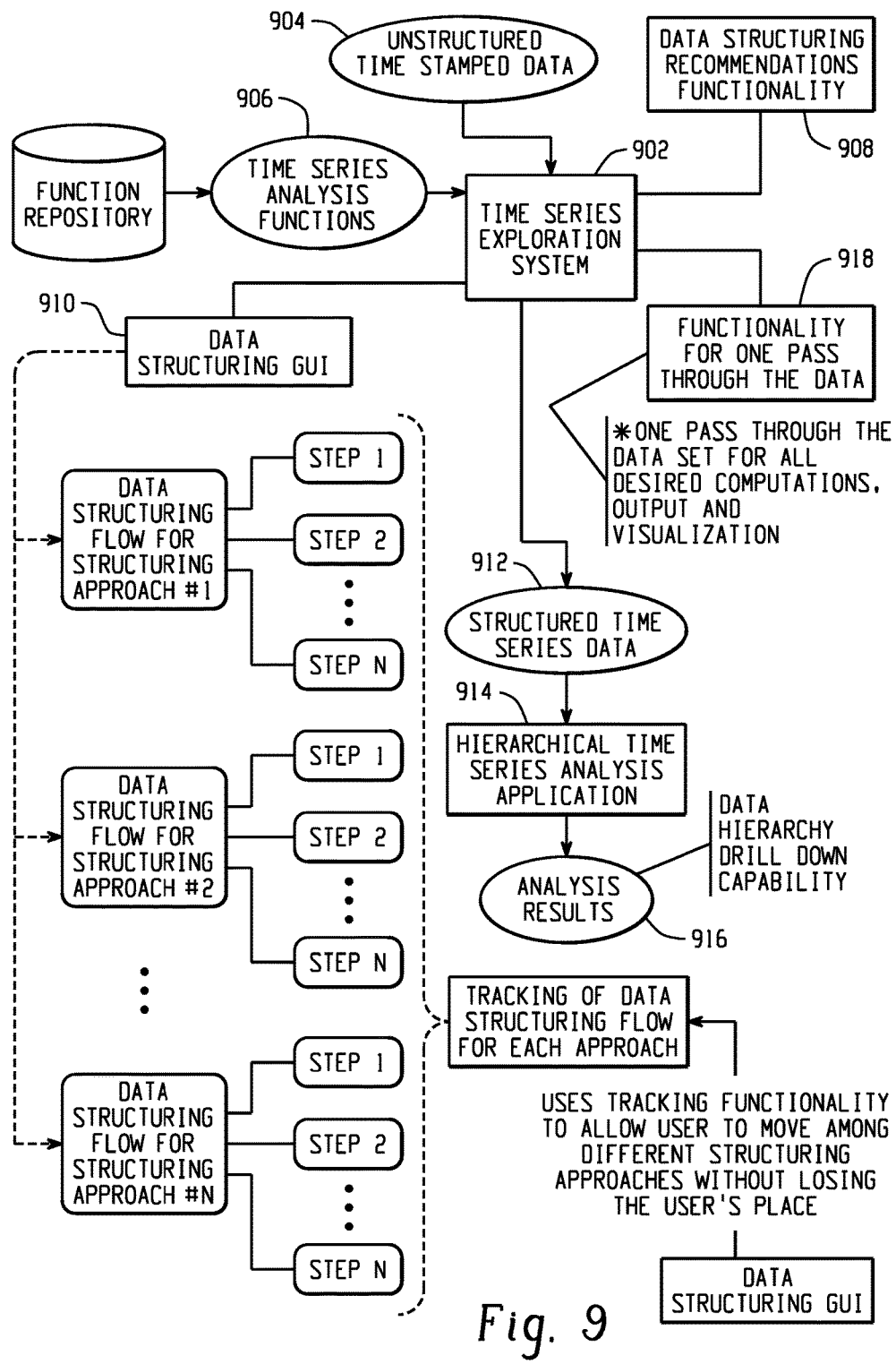
FIG. 9 is a block diagram depicting a structuring of unstructured time stamped data in one pass through the data.

FIG. 9 is a block diagram depicting a structuring of unstructured time stamped data in one pass through the data. A time series exploration system 902 receives unstructured time stamped data 904 and a selection of one or more time series analysis functions 906 to execute on the unstructured data 904. The time series exploration system 902 may provide recommendations for structuring the data at 908, and a user may provide input into the data structuring process at 910. The unstructured data 904 is formatted into structured time series data 912 and provided to a hierarchical time series analysis application at 914, where a selected time series analysis function 906 is executed to generate analysis results 916.

Functionality for operating on the unstructured data in a single pass 918 can provide the capability to perform all structuring, desired computations, output, and visualizations in a single pass through the data. Each candidate structure runs in a separate thread. Such functionality 918 can be advantageous, because multiple read accesses to a database, memory, or other storage device can be costly and inefficient. In one example, a computer-implemented method of analyzing unstructured time stamped data of a physical process through one-pass includes a step of analyzing a distribution of time-stamped unstructured data to identify a plurality of potential hierarchical structures for the unstructured data. A hierarchical analysis of the potential hierarchical structures is performed to determine an optimal frequency and a data sufficiency metric for the potential hierarchical structures. One of the potential hierarchical structures is selected as a selected hierarchical structure based on the data sufficiency metrics. The unstructured data is structured according to the selected hierarchical structure and the optimal frequency associated with the selected hierarchical structure, where the structuring of the unstructured data is performed via a single pass though the unstructured data. The identified statistical analysis of the physical process is then performed using the structured data.

Figure 10:
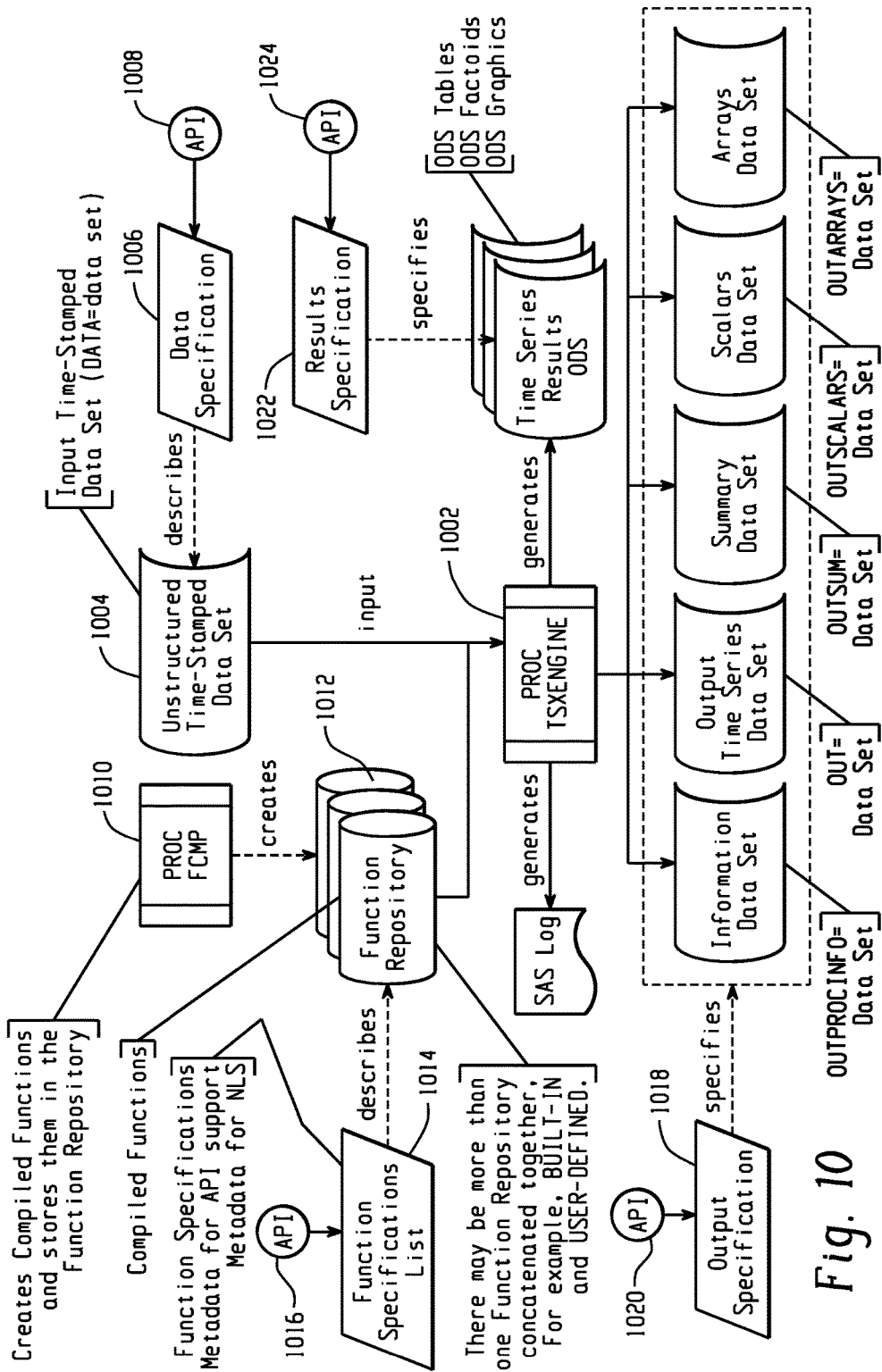
FIG. 10 is a block diagram depicting example SAS® procedures that can be combined to implement a method of analyzing unstructured time stamped data.

FIG. 10 is a block diagram depicting example SAS® procedures that can be combined to implement a method of analyzing unstructured time stamped data. In the example of FIG. 10, a SAS Time Series Explorer Engine (TSXEngine or PROC TIMEDATA) 1002 is utilized. Similar to the High Performance Forecasting Engine (HPFENGINE) for Forecast Server, the TSXENGINE 1002 provides large-scale processing and analysis of time-stamped data (e.g., serial or parallel processing). TSXENGINE provides both built-in capabilities and user-defined capabilities for extensibility. TSXENGINE can utilize one pass through a data set to create all needed computations. Because many time series related computations are input/output (I/O) bound, this capability can provide a performance improvement. Using the TSXENGINE can provide testability, maintainability, and supportability, where all numerical components can be performed in batch, where testing and support tools (e.g., SAS testing/support tools) can be utilized.

Given an unstructured time-stamped data set 1004, a data specification 1006 applies both a hierarchical and time frequency structure to form a structured time series data set. The TSXENGINE 1002 forms a hierarchical time series data set at particular time frequency. Multiple structures can be applied for desired comparisons, each running in a separate thread.

The data specification 1006 can be specified in SAS code (batch). The data specification API 1008 processes the interactively provided user information and generates the SAS code to structure the time series data 1004. The data specification API 1008 also allows the user to manage the various structures interactively.

Because there are many ways to analyze time series data, user-defined time series functions can be created using the FCMP procedure 1010 (PROC FCMP or the FCMP Function Editor) and stored in the function repository 1012. A function specification 1014 is used to describe the contents of the function repository 1012 and maps the functions to the input data set 1004 variables which allow for re-use. These functions allow for the transformation or the reduction of time series data. Transformations are useful for discovery patterns in the time series data by transforming the original time series 1004 into a more coherent form. Reductions summarize the time series data (dimension reductions) to a smaller number of statistics which are useful for parametric queries and time series ranking. Additionally, functions (transformations, reductions, etc.) can receive multiple inputs and provide multiple outputs.

The function specification 1014 can be specified in SAS code (batch). The function specification API 1016 processes the interactively provided user information and generates the SAS code to create and map the user-defined functions. The function specification API 1016 allows the user to manage the functions interactively.

Because there are many possible computational details that may be useful for time series exploration, the output specification 1018 describes the requested output and form for persistent storage. The output specification 1018 can be specified in SAS code (batch). The output specification API 1020 processes the interactively provided user information and generates the need SAS code to produce the requested output. The output specification API 1020 allows the user to manage the outputs interactively.

Because there are many possible visualizations that may be useful for time series exploration, the results specification 1022 describes the requested tabular and graphical output for visualization. The results specification 1022 can be specified in SAS code (batch). The results specification API 1024 processes the interactively provided user information and generates the need SAS code to produce the requested output. The results specification API 1024 allows the user to manage the outputs interactively.

Given the data specification 1006, the function specification 1012, the output specification 1018, and the results specification 1022, the TSXENGINE 1002 reads the unstructured time-stamped data set 1004, structures the data set with respect to the specified hierarchy and time frequency to form a hierarchical time series, computes the transformations and reductions with respect user-specified functions, outputs the desired information in files, and visualizes the desire information in tabular and graphical form.

The entire process can be specified in SAS code (batch). The time series exploration API processes the interactively provided user information and generates the need SAS code to execute the entire process. The system depicted in FIG. 10 may process a batch of data in one pass through the data. Time-stamped data set can be very large, and multiple reads and write are not scalable. Thus, the TSXENGINE 1002 allows for one pass through the data set for all desired computations, output, and visualization. The depicted system is flexible and extensible. The user can define any time series function (transformations, reductions, etc.) and specify the variable mapping for re-use. Additionally, functions (transformations, reductions, etc.) can receive multiple inputs and provide multiple outputs. The system can provide coordinated batch and interactive management. The user can interactively manage all aspects of the time series exploration process. The system can also provide coordinated batch and interactive execution. The SAS code allows for batch use for scalability. The APIs allow for interactive use. Both can be coordinated to allow for the same results. The system can further provide coordinated batch and interactive persistence. A time series exploration API allows for the persistence of the analyses for subsequent post processing of the results. Further, the system can provide parallelization, where each set of time series is processed separately on separate computational threads.

Figure 11:
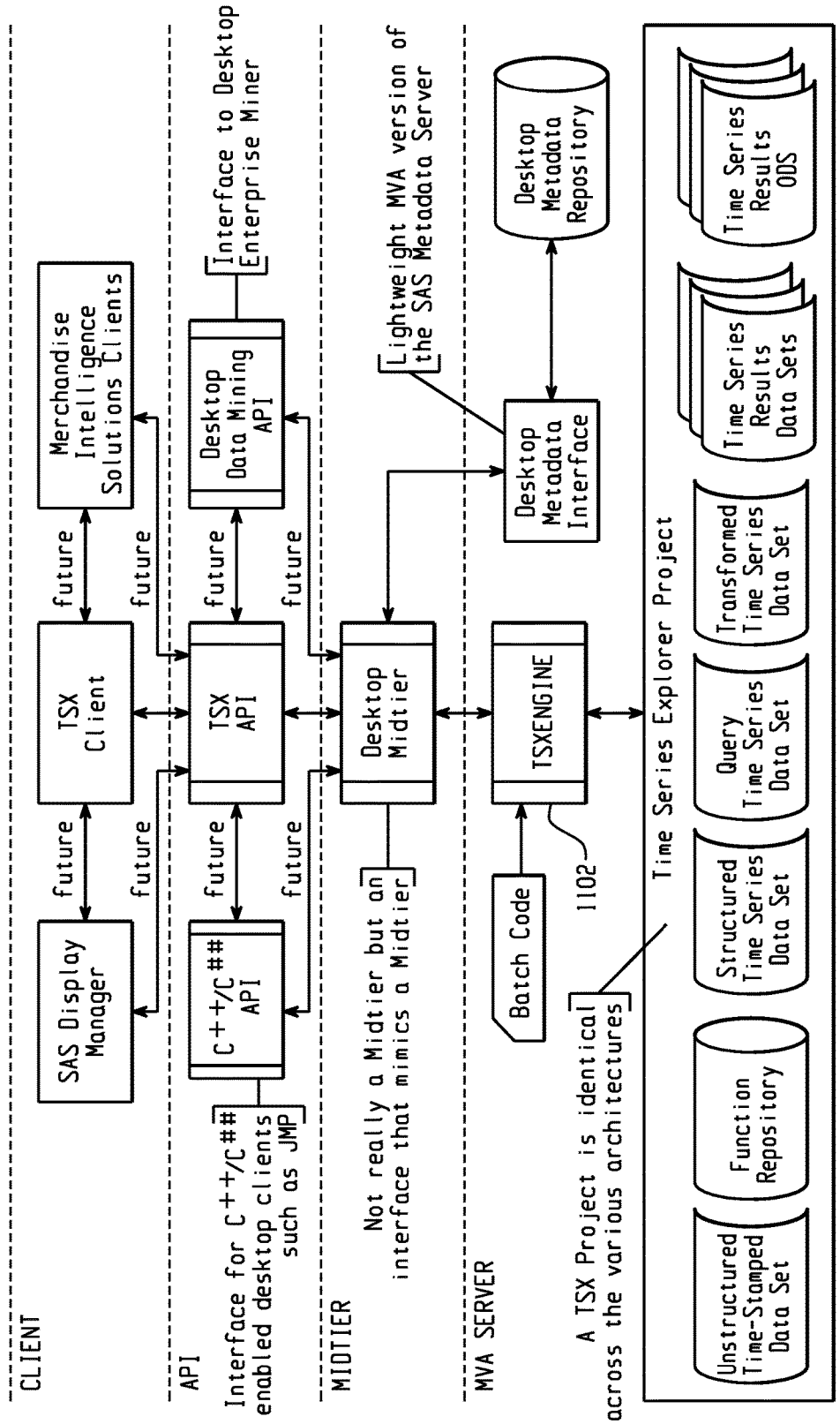
FIG. 11 depicts a block diagram depicting a time series explorer desktop architecture built on a SAS Time Series Explorer Engine.

FIG. 11 depicts a block diagram depicting a time series explorer desktop architecture built on a SAS Time Series Explorer Engine. Results from a TSXENGINE 1102 may be provided using a TSX API (e.g., Java Based). A desktop architecture allows for testability, maintainability, and supportability because all code generation can be performed in batch using JUnit test tools. Additionally, the desktop architecture can provide a simpler development and testing environment for the TSX API and TSX Client. The desktop architecture allows for integration with other desktop clients (e.g., SAS Display Manager, Desktop Enterprise Miner, JMP Pro).

Figure 12:
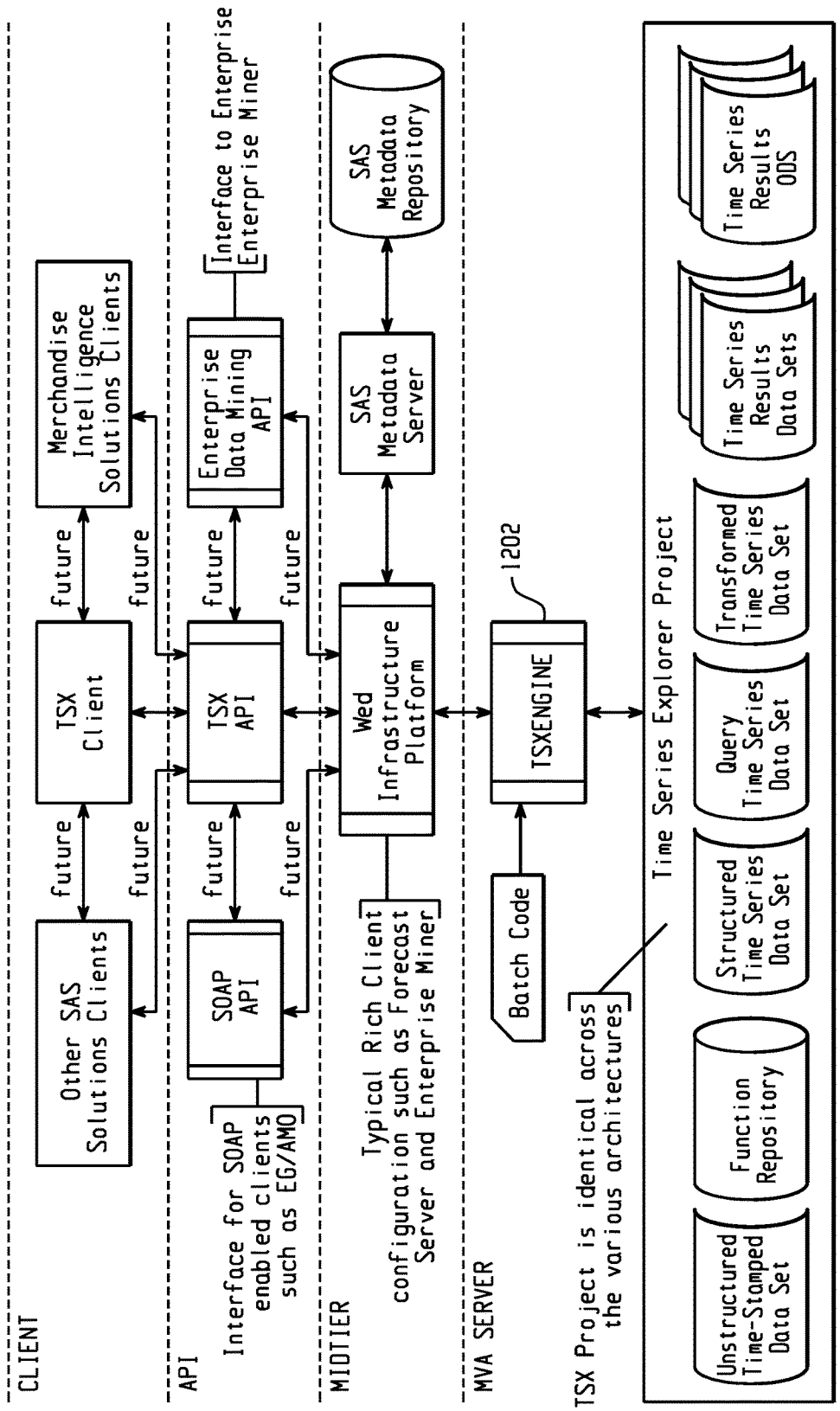
FIG. 12 depicts a block diagram depicting a time series explorer enterprise architecture built on a SAS Time Series Explorer Engine.

FIG. 12 depicts a block diagram depicting a time series explorer enterprise architecture built on a SAS Time Series Explorer Engine. Results from a TSXENGINE 1202 may be provided using a TSX API (e.g., Java Based). The enterprise architecture allows for integration with Enterprise Solutions (e.g., promotion, migration, security, etc.). The enterprise architecture allows for integration with other enterprise clients (e.g., SAS as a Solution, SAS OnDemand, (Enterprise) Enterprise Miner, EG/AMO).

Figure 13:
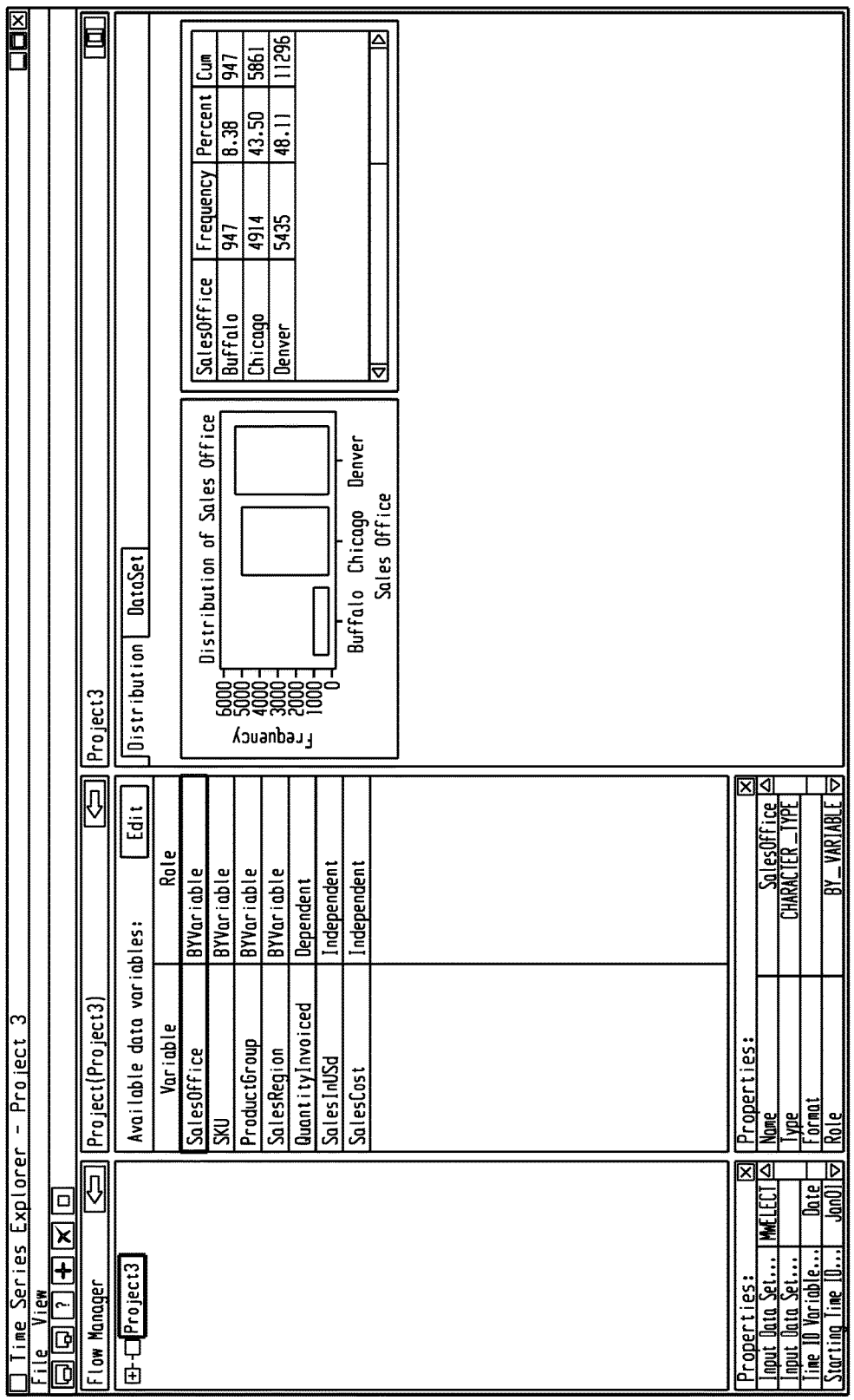
FIGS. 13-19 depict example graphical interfaces for viewing and interacting with unstructured time stamped data, structured time series data, and analysis results.
Figure 14:
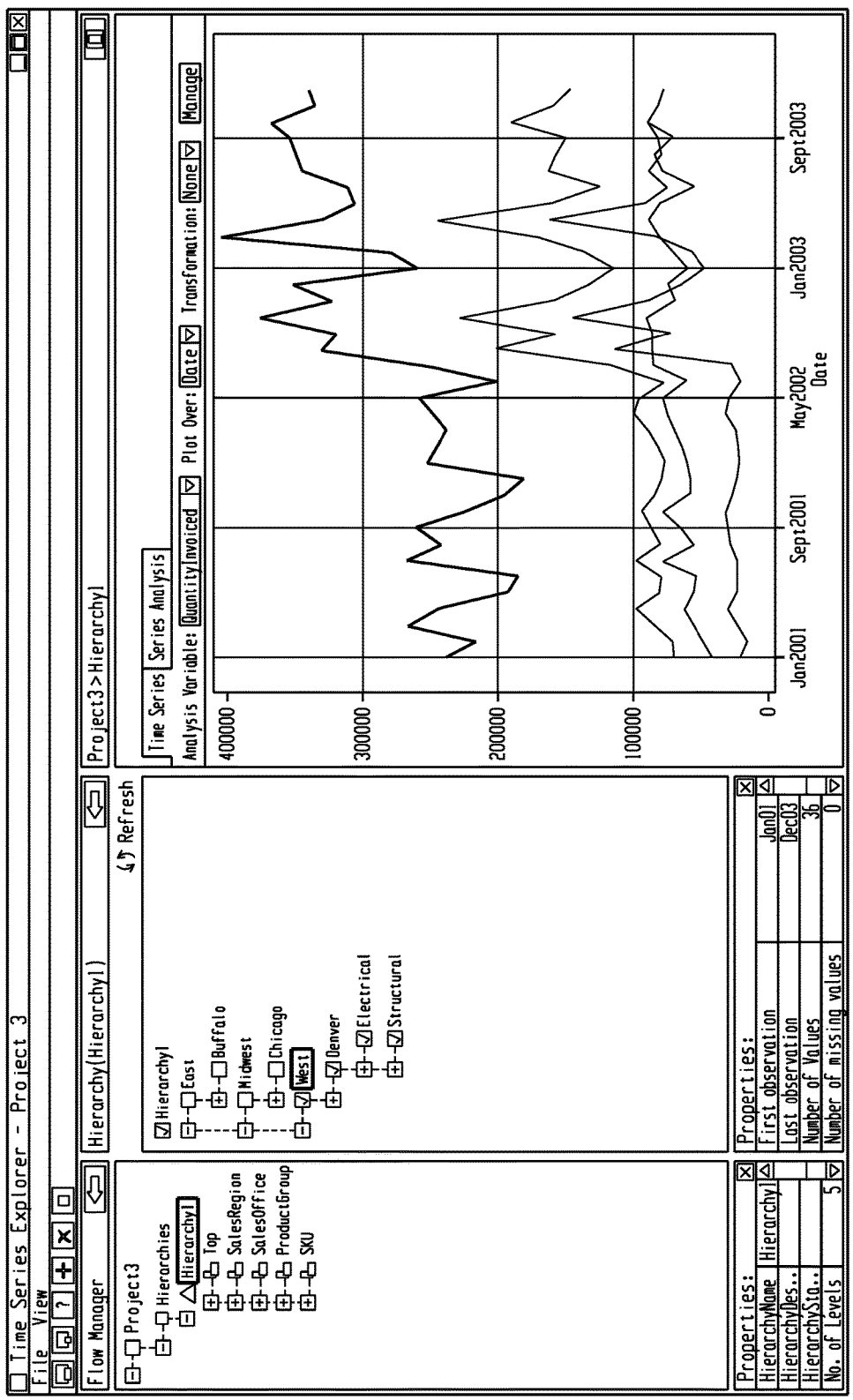
Figure 15:
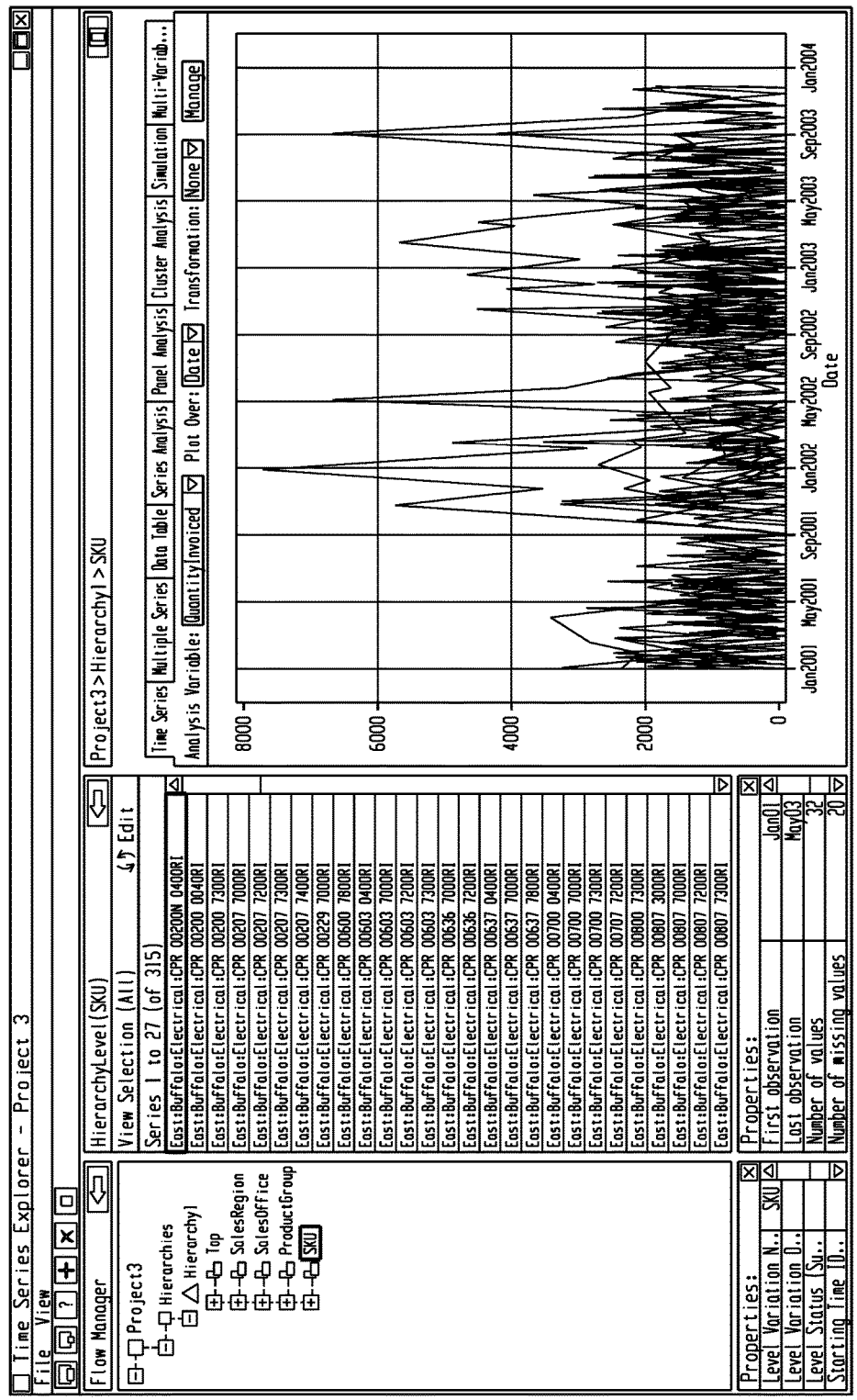

Structured time series data and analysis results, as well as unstructured time stamped data, can be displayed and manipulated by a user in many ways. FIGS. 13-19 depict example graphical interfaces for viewing and interacting with unstructured time stamped data, structured time series data, and analysis results. FIG. 13 is a graphical interface depicting a distribution analysis of unstructured timestamped data. Such an interface can be provided to a user as part of a data structuring GUI. The interface displayed in FIG. 13 aids a user in exploring different potential hierarchical structures for a data set and metrics associated with those potential structures. FIG. 14 depicts a graphical interface displaying a hierarchical analysis of structured data. Hierarchical analysis helps a user determine whether structured data is adequate, such as for a desired time series analysis function. FIG. 15 is a graphical interface displaying a large scale visualization of time series data where large amounts of data are available to explore.

Figure 16:
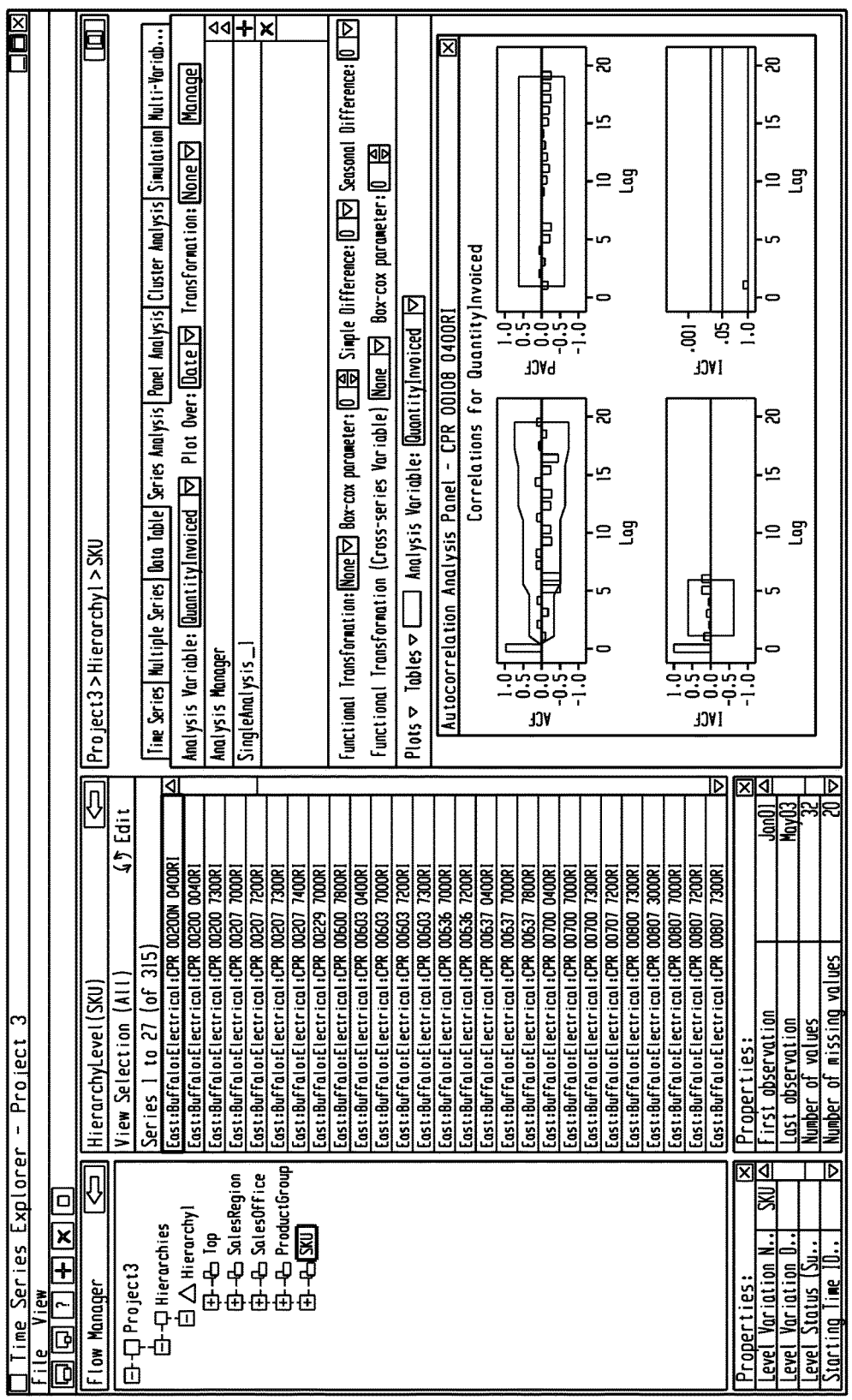
Figure 17:
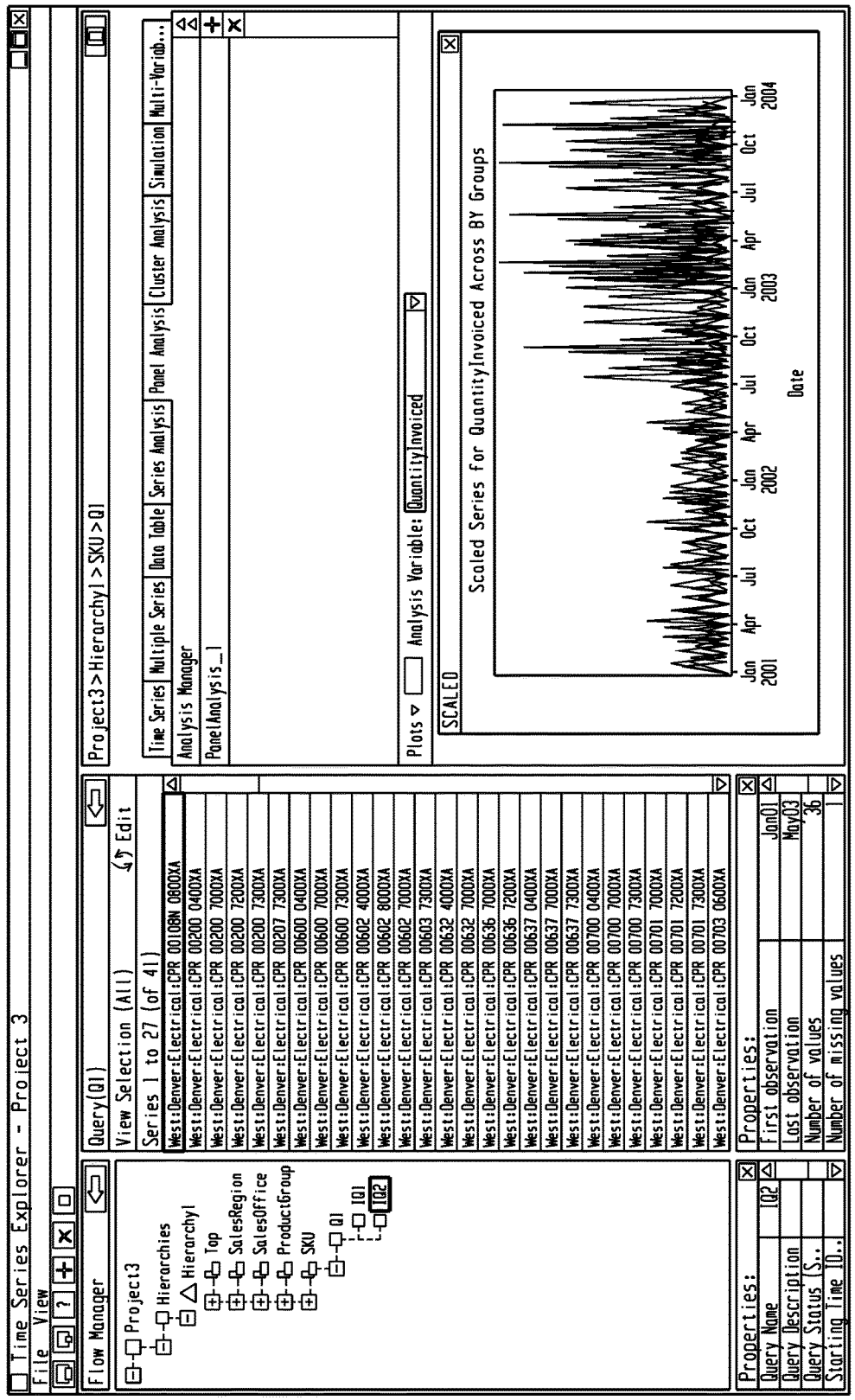
Figure 18:
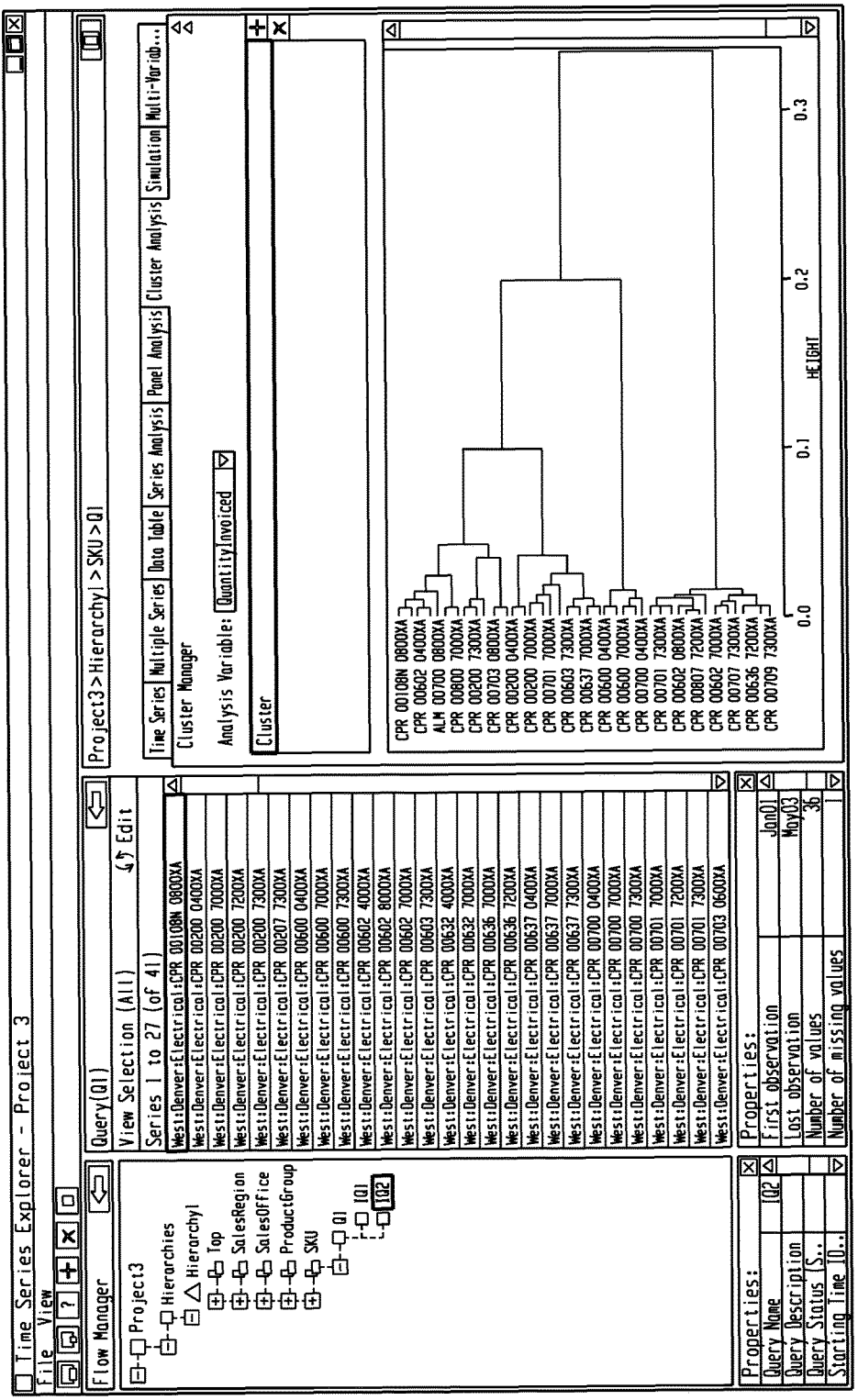
Figure 19:
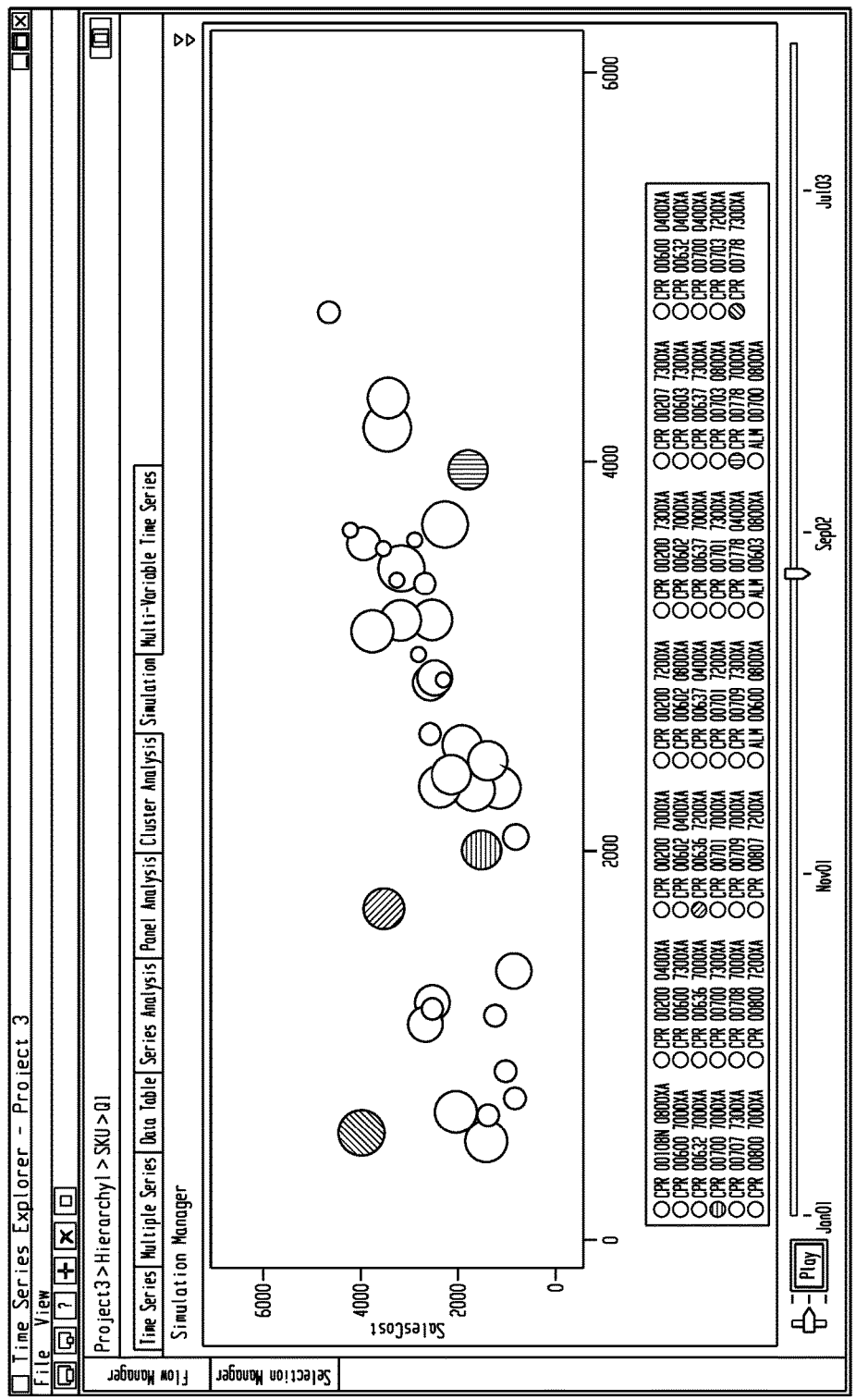

FIG. 16 is a graphical interface depicting a univariate time series statistical analysis of a structured set of data. Such an analysis can be used to discover patterns (e.g., seasonal patterns, trend patterns) in a structured time series automatically or via user input. FIG. 17 depicts a graphical interface showing panel and multivariate time series statistical analysis. Such an interface can be used to identify patterns in many time series. FIG. 18 depicts a graphical interface for time series clustering and searching. Clustering and searching operations can be used as part of an operation to identify similar time series. FIG. 19 depicts a graphical interface that provides a time slice analysis for new product diffusion analysis. A time slice analysis can be used for new product and end-of-life forecasting.

Certain algorithms can be utilized in implementing a time series exploration system. The following description provides certain notations related to an example time series exploration system.

Series Index

Let N represents the number of series recorded in the time series data set (or sample of the time series data set) and let $i=1, \ldots, N$ represent the series index. Typically, the series index is implicitly defined by the by groups associated with the data set under investigation.

Time Index

Let $t \in \{t_i^b, (t_i^b+1), \ldots, (t_i^e-1), t_i^e\}$ represent the time index where $t_i^b$ and $t_i^e$ represent the beginning and ending time index for the $i^{th}$ series, respectively. The time index is an ordered set of contiguous integers representing time periods associated with equally spaced time intervals. In some cases, the beginning and/or ending time index coincide, sometimes they do not. The time index may be implicitly defined by the time ID variable values associated with the data set under investigation.

Season Index

Let $s \in \{s_i^b, \ldots, s_i^e\}$ represent the season index where $s_i^b$ and $s_i^e$ represent the beginning and ending season index for the $i^{th}$ series, respectively. The season index may have a particular range of values, $s \in \{1, \ldots, S\}$, where S is the seasonality or length of the seasonal cycle. In some cases, the beginning and/or ending season index coincide, sometimes they do not. The season index may be implicitly defined by the time ID variable values and the Time Interval.

Cycle Index

Let $l=1, \ldots, L_i$ represent the cycle index (or life-cycle index) and $L_i=(t_i^e+1-t_i^b)$ represent the cycle length for the $i^{th}$ series. The cycle index maps to the time index as follows: $l=(t+1-t_i^b)$ and $L_i=(t_i^e+1-t_i^b)$. The cycle index represents the number of periods since introduction and ignores timing other than order. The cycle index may be implicitly defined by the starting and ending time ID variable values for each series.

Let $L^P \leq \max_i(L_i)$ be the panel cycle length under investigation. Sometimes the panel cycle length is important, sometimes it is not. The analysts may limit the panel cycle length, $L^P$, under consideration, that is subset the data; or the analyst may choose products whose panel cycle length lies within a certain range.

Time Series

Let $y_{i,t}$ represent the dependent time series values (or the series to be analyzed) where $t \in \{(t_i^b, \ldots, t_i^e\}$ is the time index for the $i^{th}$ dependent series and where $i=1, \ldots, N$. Let $\vec{y}_i = \{y_{i,t}\}_{t=t_i^b}^{t_i^e}$ represent the dependent time series vector for $i^{th}$ dependent series. Let $Y^{(t)} = \{\vec{y}_i\}_{i=1}^N$ represent the vector time series for all of the dependent time series.

Let $\vec{x}_{i,t}$ represent the independent time series vector that can help analyze the dependent series, $y_{i,t}$. Let $\vec{x}_{i,t} = \{x_{i,k,t}\}_{k=1}^K$ where $k=1, \ldots, K$ indexes the independent variables and K represents the number of independent variables. Let $\vec{X}_i = \{\vec{x}_{i,t}\}_{t=t_i^b}^{t_i^e}$ represent the independent time series matrix for $i^{th}$ dependent series. Let $X^{(t)} = \{\vec{X}_i\}_{i=1}^N$, represent matrix time series for all of the independent time series.

Together, $(y_{i,t}, \vec{x}_{i,t})$ represent the multiple time series data for the $i^{th}$ dependent series. Together, $(Y^{(t)}, X^{(t)})$ represent the panel time series data for all series (or a vector of multiple time series data).

Cycle Series

Each historical dependent time series, $y_{i,t}$, can be viewed as a cycle series (or life-cycle series) when the time and cycle indices are mapped: $y_{i,t}=y_{i,l}$ where $l=(t+1-t_i^b)$. Let $\vec{y}_i=\{y_{i,l}\}_{l=1}^{L_i}$ represent the cycle series vector for $i^{th}$ series. Let $Y^{(l)}=\{\vec{y}_i\}_{i=1}^{N}$ represent cycle series panel for all of the series. The time series values are identical to the cycle series values except for indexing (subscript).

Each independent time series vector can be indexed by the cycle index: $\vec{x}_{i,t}=\vec{x}_{i,l}$, where $l=(t+1-t_i^b)$. Similarly $\vec{X}_i=\{\vec{x}_{i,l}\}_{l=1}^{L_i}$ represents the independent time series matrix for $i^{th}$ dependent series and $X^{(l)}=\{\vec{X}_i\}_{i=1}^{N}$ represents the matrix time series for all of the independent time series.

Together, $(y_{i,l}, \vec{x}_{i,l})$ represent the multiple cycle series data for the $i^{th}$ dependent series. Together, $(Y^{(l)}, X^{(l)})$ represent the panel cycle series data for all series (or a vector of multiple cycle series data).

Reduced Data

Given the panel time series data, $(Y^{(t)}, X^{(t)})$, reduce each multiple time series, $(y_{i,t}, \vec{x}_{i,t})$, to a reduced vector, $\vec{r}_i=\{r_{i,m}\}_{m=1}^{M}$, of uniform length, M. Alternatively, given the panel cycle series data, $(Y^{(l)}, X^{(l)})$, reduce each multiple cycle series, $(y_{i,l}, \vec{x}_{i,l})$, to a reduced data vector, $\vec{r}_i=\{r_{i,m}\}_{m=1}^{M}$, of uniform length, M.

For example, $\vec{r}_i$, features extracted from the $i^{th}$ multiple time series, $(y_{i,t}, \vec{x}_{i,t})$. The features may be the seasonal indices where M is the seasonality, or the features may be the cross-correlation analysis results where M is the number of time lags.

The resulting reduced data matrix, $R=\{\vec{r}_i\}_{i=1}^{N}$ has uniform dimension (N×M). Uniform dimensions (coordinate form) are needed for many data mining techniques, such as computing distance measures and clustering data.

Similarity Matrix

Given the panel time series data, $(Y^{(t)}, X^{(t)})$, compare each multiple time series, $(y_{i,t}, \vec{x}_{i,t})$, using similarity measures. Alternatively, given the panel cycle series data, $(Y^{(l)}, X^{(l)})$, compare each multiple cycle series, $(y_{i,l}, \vec{x}_{i,l})$, using a similarity measures.

Let $s_{i,j}=Sim(\vec{y}_i, \vec{y}_j)$ represent the similarity measure between the $i^{th}$ and $j^{th}$ series. Let $\vec{s}_i=\{s_{i,j}\}_{j=1}^{N}$ represent the similarity vector of uniform length, N, for the $i^{th}$ series.

The resulting similarity matrix, $S=\{\vec{s}_i\}_{i=1}^{N}$ has uniform dimension (N×N). Uniform dimensions (coordinate form) are needed for many data mining techniques, such as computing distance measures and clustering data.

Panel Properties Matrix

Given the panel time series data, $(Y^{(t)}, X^{(t)})$, compute the reduce data matrix, $R=\{\vec{r}_i\}_{i=1}^{N}$, and/or the similarity matrix, $S=\{\vec{s}_i\}_{i=1}^{N}$. Alternatively, given the panel cycle series data, $(Y^{(l)}, X^{(l)})$, compute the reduce data matrix, $R=\{\vec{r}_i\}_{i=1}^{N}$, and/or the similarity matrix, $S=\{\vec{s}_i\}_{i=1}^{N}$.

A panel properties matrix can be formed by merging the rows of the reduce data matrix and the similarity matrix.

Let $P=(R,S)$ represent the panel properties matrix of uniform dimension (N×(M+N)). Let $\vec{p}_i=(\vec{r}_i, \vec{s}_i)$ represent the panel properties vector for the $i^{th}$ series of uniform dimension (1×(M+N)).

Distance Measures

Given the panel properties vectors, $\vec{p}_i=\{p_{i,j}\}_{j=1}^{M+N}$, of uniform length, M+N, let $d_{i,j}=D(\vec{p}_i, \vec{p}_j)$ represent the distance between the panel properties vectors associated with $i^{th}$ and $j^{th}$ series where $D()$ represents the distance measure. Let $\vec{d}_i=\{d_{i,j}\}_{j=1}^{N}$ be the distance vector associated with the $i^{th}$ series. Let $D=\{\vec{d}_i\}_{i=1}^{N}$ be the distance matrix associated with all of the series.

Distance measures do not depend on time/season/cycle index nor do they depend on the reduction dimension, M. The dimensions of the distance matrix are (N×N).

If the distance between the Panel Properties Vectors is known, $\vec{p}_i$, these distances can be used as a surrogate for the distances between the Panel Series Vectors, $(y_{i,t})$. In other words, $\vec{p}_i$ is close $\vec{p}_j$ to; then $(y_{i,t})$ is close to $(y_{j,t})$.

Attribute Index

Let K represents the number of attributes recorded in the attribute data and let $k=1, \ldots, K$ represent the attribute index.

For example, K could represent the number of attributes associated with the products for sale in the marketplace and k could represent the $k^{th}$ attribute of the products.

There may be many attributes associated with a given time series. Some or all of the attributes may be useful in the analysis. In the following discussion, the attributes index, $k=1, \ldots, K$, may represent all of the attributes or those attributes that are deemed important by the analyst.

Typically, the number of attribute variables is implicitly defined by the number of selected attributes.

Attribute Data

Let $a_{i,k}$ represent the attribute data value for $k^{th}$ attribute associated with $i^{th}$ series. The attribute data values are categorical (ordinal, nominal) and continuous (interval, ratio). Let $\vec{a}_i=\{(a_{i,k})\}_{k=1}^{K}$ represent the attribute data vector for the $i^{th}$ series where $i=1, \ldots, N$. Let $A=\{\vec{a}_i\}_{i=1}^{N}$ be the set of all possible attribute data vectors. Let $A_k=\{a_{i,k}\}_{i=1}^{N}$ be the set of attribute values for the $k^{th}$ attribute for all the series.

For example, $a_{i,k}$ could represent consumer demographic, product distribution, price level, test market information, or other information for the $i^{th}$ product.

Analyzing the (discrete or continuous) distribution of an attribute variable values, $A_k=\{a_{i,k}\}_{i=1}^{N}$, can be useful for new product forecasting in determining the attribute values used to select the pool of candidate products to be used in the analysis. In general, a representative pool of candidate products that are similar to the new product is desired; however, a pool that is too large or too small is often undesirable. A large pool may be undesirable because the pool may not be homogeneous in nature. A small pool may be undesirable because it may not capture all of the potential properties and/or variation.

Let $A=\{\vec{a}_i\}_{i=1}^{N}$ represent the attribute data set. In the following discussion, the attributes data set, A, may represent all of the attributes or those attributes that are deemed important to the analyses.

The attributes may not depend on the time/season/cycle index. In other words, they are time invariant. The analyst may choose from the set of the attributes and their attribute values for consideration. Sometimes the product attributes are textual in nature (product descriptions, sales brochures, and other textual formats). Text mining techniques may be used to extract the attribute information into formats usable for statistical analysis. Sometimes the product attributes are visual in nature (pictures, drawings, and other visual formats). This information may be difficult to use in statistical analysis but may be useful for judgmental analysis.

Derived Attribute Index

Let J represents the number of derived attributes computed from the time series data and let j=1, . . . , J represent the derived attribute index.

For example, J could represent the number of derived attributes associated with the historical time series data and j could represent the $j^{th}$ derived attribute.

There may be many derived attributes associated with the historical time series data set. Some or all of the derived attributes may be useful in the analysis. In the following discussion, the derived attributes index, j=1, . . . , J, may represent all of the derived attributes or those derived attributes that are deemed important by the analyst.

Typically, the number of derived attribute variables is implicitly defined by the number of selected derived attributes.

Derived Attribute Data

Let $g_{i,j}$ represent the derived attribute data value for $j^{th}$ derived attribute associated with $i^{th}$ series. The attribute data values are categorical (interval, ordinal, nominal). Let $\vec{g}_i = \{g_{i,j}\}_{j=1}^{J}$ represent the derived attribute data vector for the $i^{th}$ series where i=1, . . . , N. Let $G=\{\vec{g}_i\}_{i=1}^{N}$ be the set of all possible derived attribute data vectors. Let $G_j=\{g_{i,j}\}_{i=1}^{N}$ be the set of attribute values for the $j^{th}$ derived attribute for all the series.

For example, $g_{i,j}$ could represent a discrete-valued cluster assignment, continuous-valued price elasticity, continuous-valued similarity measure, or other information for the $i^{th}$ series.

Analyzing the (discrete or continuous) distribution of an derived attribute variable values, $G_j=\{g_{i,j}\}_{i=1}^{N}$, is useful for new product forecasting in determining the derived attribute values used to select the pool of candidate products to be used in the analysis. In general, a representative pool of candidate products that are similar to the new product is desired; however, a pool that is too large or too small is often undesirable. A large pool may be undesirable because the pool may not be homogeneous in nature. A small pool may be undesirable because it may not capture all of the potential properties and/or variation.

Let $G=\{\vec{g}_i\}_{i=1}^{N}$ represent the derived attribute data set. In the following discussion, the derived attributes data set, G, may represent all of the derived attributes or those derived attributes that are deemed important to the analyses. The derived attributes may not depend on the time/season/cycle index. In other words, they may be time invariant. However, the means by which they are computed may depend on time. The analyst may choose from the set of the derived attributes and their derived attribute values for consideration.

Certain computations may be made by a time series exploration system. The following describes certain of those computations. For example, given a panel series data set, the series can be summarized to better understand the series global properties.

Univariate Time Series Descriptive Statistics

Given a time series, $y_{i,t}$, or cycle series, $y_{i,l}$, summarizes the time series using descriptive statistics. Typically, the descriptive statistics are vector-to-scalar data reductions and have the form: $\alpha_i = \text{UnivariateDescriptiveStatistic}(\vec{y}_i)$ For example:
Start, $start_i$, starting time ID value
End, $end_i$, ending time ID value
StartObs, $startobs_i$, starting observation
EndObs, $endobs_i$, ending observation
NObs, $nobs_i$, n, number of observations
NMiss, $nmiss_i$, number of missing values
N, $n_i$, number of nonmissing values $$\text{Sum}, sum_i = \sum_{t=t_i^b}^{t_i^e} y_{i,t} = \sum_{l=1}^{L_i} y_{i,l},$$

missing values are ignored in the summation

Mean $$\mu_i = \frac{sum_i}{(L_i - nmiss_i)},$$

StdDev, $$\sigma_i = \sqrt{\frac{1}{(L_i - nmiss_i - 1)} \sum_{t=t_i^b}^{t_i^e} (y_{i,t} - \mu_i)^2} = \sqrt{\frac{1}{(L_i - nmiss_i - 1)} \sum_{l=1}^{L_i} (y_{i,l} - \mu_i)^2},$$

missing values are ignored in the summation $$\text{Minimum}, m_i = \min_{t} (y_{i,t}) = \min_{l} (y_{i,l}),$$

missing values are ignored in the minimization $$\text{Maximum}, M_i = \max_{t} (y_{i,t}) = \max_{l} (y_{i,l}),$$

missing values are ignored in the maximization

Range, $R_i = M_i - m_i$

Time series descriptive statistics can be computed for each independent time series vector.

Vector Series Descriptive Statistics

Given a panel time series, $Y^{(t)}$, or panel cycle series, $Y^{(l)} = Y^{(l)}$, summarize the panel series using descriptive statistics. Essentially, the vector series descriptive statistics summarize the univariate descriptive statistics. Typically, the vector descriptive statistics are matrix-to-scalar data reductions and have the form: $\alpha = \text{VectorDescriptiveStatistic}(Y^{(t)})$ Following are some examples:
Start, start, starting time ID value
End, end, ending time ID value
StartObs, startobs, starting observation
EndObs, endobs, ending observation
NObs, nobs, number of observations
NMiss, nmiss, number of missing values
N, n, number of nonmissing values $$\text{Minimum}, m = \min_{i} (m_i),$$

missing values are ignored in the minimization $$\text{Maximum, } M = \max_i (M_i),$$

missing values are ignored in the maximization

Range, R=M−m

Likewise, vector series descriptive statistics can be computed for each independent time series vector.

Certain transformations may be performed by a time series exploration system. The following describes certain example time series transformations.

Given a panel series data set, the series can be transformed to another series which permits a greater understanding of the series properties over time.

Univariate Time Series Transformations

Given a time series, $y_{i,t}$, or cycle series, $y_{i,l}$, univariately transform the time series using a univariate time series transformation. Typically, univariate transformations are vector-to-vector (or series-to-series) operations and have the form: $\vec{z}_i$=UnivariateTransform($\vec{y}_i$)

Following are some examples:

Scale, $\vec{z}_i$=scale($\vec{y}_i$), scale the series from zero to one

CumSum, $\vec{z}_i$=cusum($\vec{y}_i$), cumulatively sum the series

Log, $\vec{z}_i$=log($\vec{y}_i$), series should be strictly positive

Square Root, $\vec{z}_i=\sqrt{\vec{y}_i}$, series should be strictly positive

Simple Difference, $z_{i,t}=(y_{i,t}-y_{i,(t-1)})$

Seasonal Difference, $z_{i,t}=(y_{i,t}-y_{i,(t-S)})$, series should be seasonal

Seasonal Adjustment, $z_t$=SeasonalAdjusment($\vec{y}_i$)

Singular Spectrum, $z_t$=SSA($\vec{y}_i$)

Several transformations can be performed in sequence (e.g., a log simple difference). Transformations help analyze and explore the time series.

Multiple Time Series Transformations

Given a dependent time series, $y_{i,t}$, or cycle series, $y_{i,l}$, and an independent time series, $x_{i,t}$, multivariately transform the time series using a multiple time series transformation. Typically, multiple time series transforms are matrix-to-vector operations and have the form: $\vec{z}_i$=Multiple Transforms($\vec{y}_i, \vec{x}_i$)

For example:

Adjustment, $\vec{z}_i$=Adjustment($\vec{y}_i, \vec{x}_i$)

Several multivariate transformations can be performed in sequence.

Vector Series Transformations

Given a panel time series, $y_{i,t}$, or panel cycle series, $y_{i,t}=y_{i,l}$, multivariately transform the panel series using a vector series transformation. Typically, the vector transformations are matrix-to-matrix (panel-to-panel) operations and have the form: Z=Vector Transform(Y)

Many vector transformations are just univariate transformations applied to each series individually. For each series index $\vec{z}_i$=UnivariateTransform($\vec{y}_i$) i=1, . . . ,N Some vector transformations are applied to a vector series jointly.

For example:

Standardization Z=$(\Omega^{-1})'YQ^{-1}$ $\Omega$=cov(Y,Y)

Certain time series data reduction operations may be performed by a time series exploration system. Data mining techniques include clustering, classification, decision trees, and others. These analytical techniques are applied to large data sets whose observation vectors are relatively small in dimension when compared to the length of a transaction series or time series. In order to effectively apply these data mining techniques to a large number of series, the dimension of each series can be reduced to a small number of statistics that capture their descriptive properties. Various transactional and time series analysis techniques (possibly in combination) can be used to capture these descriptive properties for each time series.

Many transactional and time series databases store the data in longitudinal form, whereas many data mining software packages utilize the data in coordinate form. Dimension reduction extracts important features of the longitudinal dimension of the series and stores the reduced sequence in coordinate form of fixed dimension. Assume that there are N series with lengths $\{T_1, \ldots, T_N\}$.

In longitudinal form, each variable (or column) represents a single series, and each variable observation (or row) represents the series value recorded at a particular time. Notice that the length of each series, $T_i$, can vary.

$$\vec{y}_i = \{y_{i,t}\}_{t=1}^{T_i} \text{ for } i=1, \ldots, N$$

where $\vec{y}_i$ is ($T_i \times 1$). This form is convenient for time series analysis but less desirable for data mining.

In coordinate form, each observation (or row) represents a single reduced sequence, and each variable (or column) represents the reduced sequence value. Notice that the length of each reduced sequence, M, is fixed.

$$\vec{r}_i = \{r_{i,m}\}_{m=1}^{M} \text{ for } i=1, \ldots, N$$

where $\vec{r}_i$ is (1×M). This form is convenient for data mining but less desirable for time series analysis.

To reduce a single series, a univariate reduction transformation maps the varying longitudinal dimension to the fixed coordinate dimension.

$$\vec{r}_i = \text{Reduce}_i(\vec{y}_i) \text{ for } i=1, \ldots, N$$

where $\vec{r}_i$ is (1×M), $Y_i$ is ($T_i \times 1$), and $\text{Reduce}_i(\ )$ is the reduction transformation (e.g., seasonal decomposition).

For multiple series reduction, more than one series is reduced to a single reduction sequence. The bivariate case is illustrated.

$$\vec{r}_i = \text{Reduce}_i(\vec{y}_i, \vec{x}_{i,k}) \text{ for } i=1, \ldots, N$$

where $\vec{r}_i$ is (1×M), $\vec{y}_i$ is ($T_i \times 1$), $\vec{x}_{i,k}$ is ($T_i \times 1$), and $\text{Reduce}_i(\ )$ is the reduction transformation (e.g., cross-correlations).

In the above discussion, the reduction transformation, $\text{Reduce}_i(\ )$, is indexed by the series index, i=1, . . . , N, but typically it does not vary and further discussion assumes it to be the same, that is, $\text{Reduce}(\ )=\text{Reduce}_i(\ )$.

Univariate Time Series Data Reductions

Given a time series, $y_{i,t}$, or cycle series, $y_{i,l}$, univariately reduce the time series using a time series data reduction. Typically, univariate reductions are vector-to-vector operations and have the form: $\vec{r}_i$=UnivariateReduction($\vec{y}_i$)

Following are some examples:

Autocorrelation, $\vec{r}_i$=ACF($\vec{y}_i$)

Seasonal Decomposition, $\vec{r}^i$=SeasonalDecomposition($\vec{y}_i$)

Multiple Time Series Data Reductions

Given a dependent time series, $y_{i,t}$, or cycle series, $y_{i,l}$, and an independent time series, $x_{i,t}$, multivariately reduce the time series using a time series data reduction. Typically, multiple time series reductions are matrix-to-vector operations and have the form: $\vec{r}_i=\text{MultipleReduction}(\vec{y}_i,\vec{x}_i)$ For example, Cross-Correlation, $\vec{r}_i=CCF(\vec{y}_i,\vec{x}_i)$ Vector Time Series Data Reductions Given a panel time series, $y_{i,t}$, or panel cycle series, $y_{i,t}=y_{i,l}$, multivariately reduce the panel series using a vector series reduction. Typically, the vector reductions are matrix-to-matrix operations and have the form: $R=\text{VectorReduction}(Y)$ Many vector reductions include univariate reductions applied to each series individually. For each series index $\vec{r}_i=\text{UnivariateReduction}(\vec{y}_i)\ i=1,\ldots,N$ Some vector reductions are applied to a vector series jointly.
For example:

Singular Value Decomposition, $R=SVD(Y)$

A time series exploration system may perform certain attribute derivation operations. For example, given a panel series data set, attributes can be derived from the time series data.

Univariate Time Series Attribute Derivation

Given a time series, $y_{i,t}$, or cycle series, $y_{i,l}$, derive an attribute using a univariate time series computation. Typically, univariate attribute derivations are vector-to-scalar operations and have the form: $g_{i,j}=\text{UnivariateDerivedAttribute}(\vec{y}_i)$ For example:

Sum, $g_{i,j}=\text{Sum}(\vec{y}_i)$

Mean, $g_{i,j}=\text{Mean}(\vec{y}_i)$

Multiple Time Series Attribute Derivation

Given a dependent time series, $y_{i,t}$, or cycle series, $y_{i,l}$, and an independent time series, $x_{i,t}$, derive an attribute using a multiple time series computation. Typically, multiple attribute derivations are matrix-to-scalar operations and have the form: $g_{i,j}=\text{MultipleDerivedAttribute}(\vec{y}_i,\vec{x}_i)$ Following are some examples:

Elasticity, $g_{i,j}=\text{Elasticity}(\vec{y}_i,\vec{x}_i)$

Cross-Correlation, $g_{i,j}=\text{CrossCorr}(\vec{y}_i,\vec{x}_i)$

Vector Series Attribute Derivation

Given a panel time series, $Y^{(t)}$, or panel cycle series, $Y^{(t)}=Y^{(l)}$, compute a derived attribute values vector associated with the panel series. Essentially, the vector attribute derivation summarizes or groups the panel time series. Typically, the vector series attribute derivations are matrix-to-vector operations and have the form: $G_j=\text{VectorDerivedAttribute}(Y^{(t)})$ Many vector series attribute derivations are just univariate or multiple attribute derivation applied to each series individually. For each series indices, $g_{i,j}=\text{UnivariateDerivedAtturibute}(\vec{y}_i)\ i=1,\ldots,N$

OR $g_{i,j}=\text{MultipleDerivedAvedAttribute}(\vec{y}_i,\vec{x}_i)\ i=1,\ldots,N$ Some vector series attribute derivations are applied to a vector series jointly.
For example:

Cluster, $G_j=\text{Cluster}(Y^{(t)})$, cluster the time series

Data provided to, utilized by, and outputted by a time series exploration system may be structured in a variety of forms. The following describes concepts related to the storage and representation of the time series data.

Storage of Panel Series Data

Table 1 describes the storage of the Panel Series Data.

TABLE 1

Panel Series Data Storage Example

| Row | A | B | C | i (implied) | t (implied) | $y_{i,t}$ | $x_{i,1,t}$ | $x_{i,2,t}$ | $x_{i,3,t}$ |
|---|---|---|---|---|---|---|---|---|---|
| 1 | AA | BB | CC | 1 | 2 | | | | |
| 2 | AA | BB | CC | 1 | 3 | | | | |
| 3 | AA | BB | CC | 1 | 4 | | | | |
| 4 | AA | BB | CC | 1 | 5 | | | | |
| 5 | AA | BBB | CCC | 2 | 1 | | | | |
| 6 | AA | BBB | CCC | 2 | 2 | | | | |
| 7 | AA | BBB | CCC | 2 | 3 | | | | |
| 8 | AAA | BBBB | CCCC | 3 | 3 | | | | |
| 9 | AAA | BBBB | CCCC | 3 | 4 | | | | |
| 10 | AAA | BBBB | CCCC | 3 | 5 | | | | |
| 11 | AAA | BBBB | CCCC | 3 | 6 | | | | |
| | | | | | | VECTOR | VECTOR | VECTOR | VECTOR |

Table 1 represents a panel series. Different areas of the table (e.g., the empty boxes in rows 1-4, the empty boxes in rows 5-7, or the empty boxes in rows 8-11) represent a multiple time series. Each analysis variable column in each multiple time series of the table represents a univariate time series. Each analysis variable column represents a vector time series.

Internal Representation of Panel Series Data

The amount of data associated with a Panel Series may be quite large. The Panel Series may be represented efficiently in memory (e.g., only one copy of the data in memory is stored). The Panel Series, $(Y^{(t)}, X^{(t)})$, contains several multiple series data, $(y_{i,t}, \vec{x}_{i,t})$, which contains a fixed number univariate series data, $y_{i,t}$ or $\vec{x}_{i,t}$. The independent variables are the same for all dependent series though some may contain only missing values.

Figure 20:
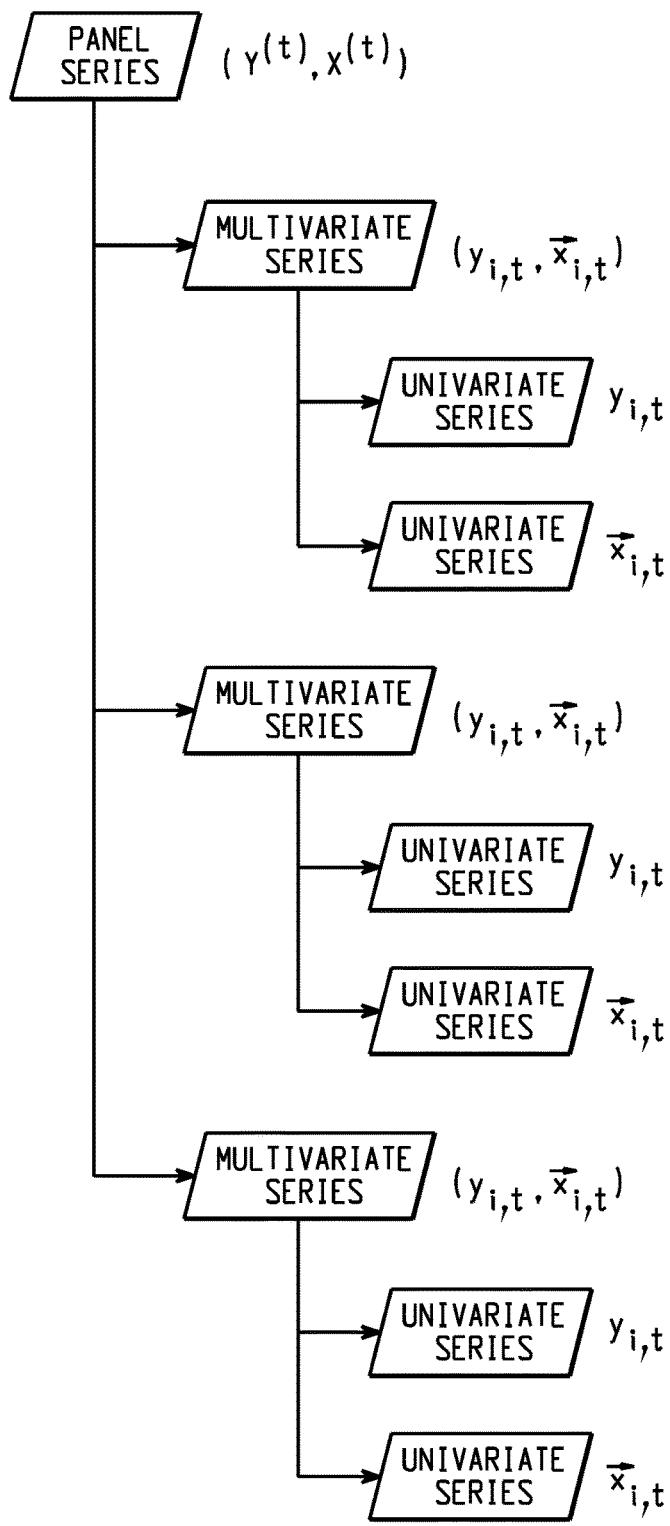
FIG. 20 depicts an example internal representation of the panel series data.

FIG. 20 depicts an example internal representation of the Panel Series Data.

Reading and Writing the Panel Series Data

The data set associated with a Panel Series may be quite large. It may be desirable to read the data set only once. The user may be warned if the data set is to be reread. Reading/writing the Panel Series Data into/out of memory may be performed as follows:

For each Multiple Time Series (or by group), read/write all of the Univariate Time Series associated with the by group. Read/write $y_{i,t}$ or $\vec{x}_{i,t}$ to form $(y_{i,t}, \vec{x}_{i,t})$ for each by group. Read/write each by group $(y_{i,t}, \vec{x}_{i,t})$ to form $Y^{(t)}, X^{(t)}$.

Figure 21:
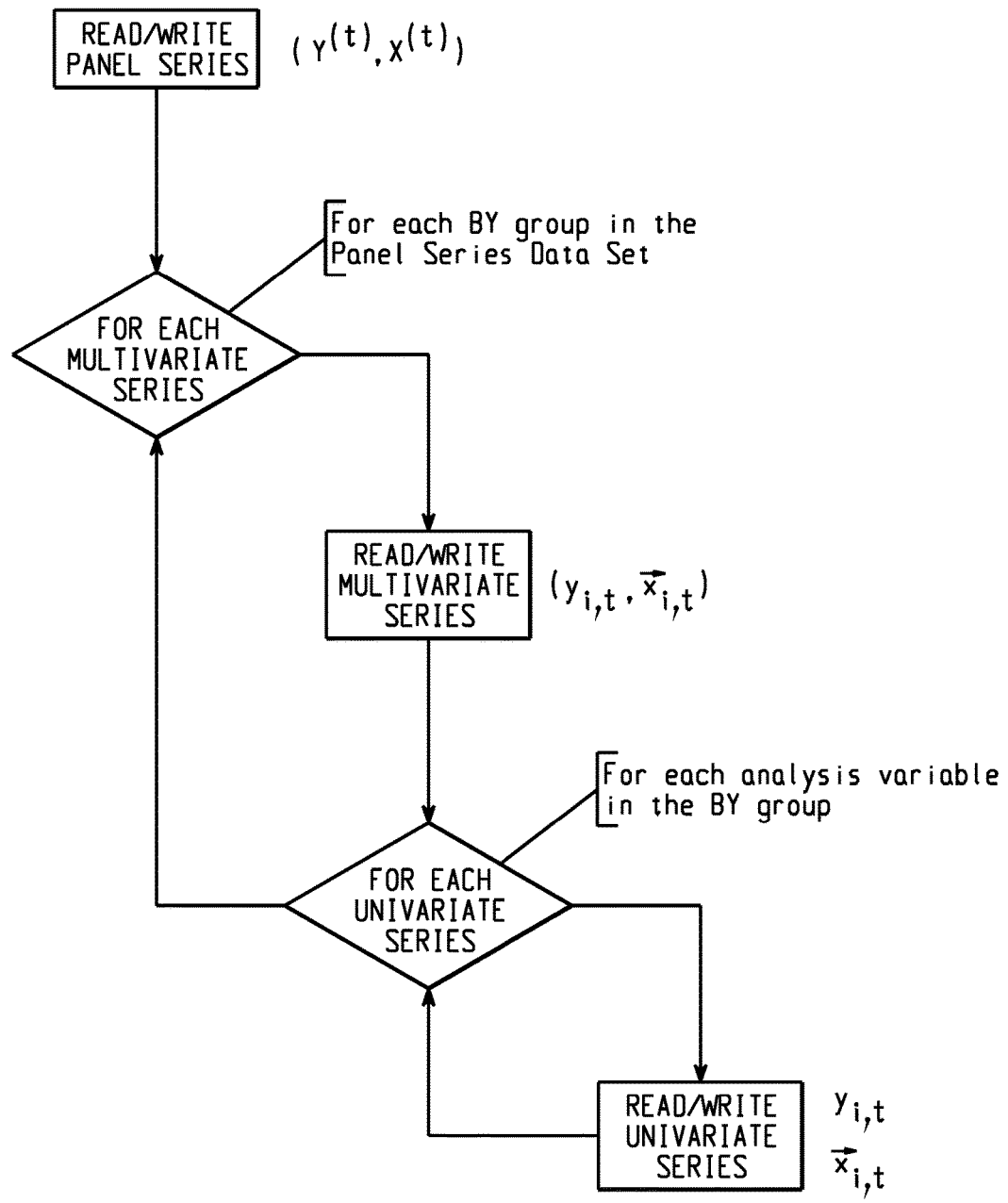
FIG. 21 depicts reading/writing of the panel series data.

FIG. 21 depicts reading/writing of the Panel Series Data.

A time series exploration may store and manipulate attribute data.

Storage of Attribute Data

Table 2 describes example storage of Attribute Data.

TABLE 2

Example Storage of Attribute Data

| A | B | C | i (implied) | $a_{i,1}$ | $a_{i,2}$ | $a_{i,3}$ | $a_{i,4}$ |
|---|---|---|---|---|---|---|---|
| AA | BB | CC | 1 | | | | |
| AA | BBB | CCC | 2 | | | | |
| AAA | BBBB | CCCC | 3 | | | | |
| | | | | VECTOR | VECTOR | VECTOR | VECTOR |

Table 2 represents an attribute data set, $A=\{\vec{a}_i\}_{i=1}^N$. The right half of each row of the table represents an attribute vector for single time series, $\vec{a}^i=\{a_{i,k}\}_{k=1}^K$. Each attribute variable column represents an attribute value vector across all time series, $A_k\{a_{i,k}\}_{i=1}^N$. Each table cell represents a single attribute value, $a_{i,k}$.

Table 2 describes different areas (e.g., the empty boxes in rows 1-4, the empty boxes in rows 5-7, or the empty boxes in rows 8-11) of following Table 3 associated with the Panel Series.

TABLE 3

Panel Series Data Example

| Row | A | B | C | i (implied) | t (implied) | $y_{i,t}$ | $x_{i,1,t}$ | $x_{i,2,t}$ | $x_{i,3,t}$ |
|---|---|---|---|---|---|---|---|---|---|
| 1 | AA | BB | CC | 1 | 2 | | | | |
| 2 | AA | BB | CC | 1 | 3 | | | | |
| 3 | AA | BB | CC | 1 | 4 | | | | |
| 4 | AA | BB | CC | 1 | 5 | | | | |
| 5 | AA | BBB | CCC | 2 | 1 | | | | |
| 6 | AA | BBB | CCC | 2 | 2 | | | | |
| 7 | AA | BBB | CCC | 2 | 3 | | | | |
| 8 | AAA | BBBB | CCCC | 3 | 3 | | | | |
| 9 | AAA | BBBB | CCCC | 3 | 4 | | | | |
| 10 | AAA | BBBB | CCCC | 3 | 5 | | | | |
| 11 | AAA | BBBB | CCCC | 3 | 6 | | | | |
| | | | | | | VECTOR | VECTOR | VECTOR | VECTOR |

Notice that the Panel Series has a time dimension but the Attributes do not. Typically, the attribute data set is much smaller than the panel series data set. Table 3 show that the series index, i=1, ..., N, are a one-to-one mapping between the tables. The mapping is unique but there may be time series data with no associated attributes (missing attributes) and attribute data with no time series data (missing time series data).

Internal Representation of Attribute Data

The amount of data associated with the attributes may be quite large. The Attribute Data may be represented efficiently in memory (e.g., only one copy of the data in memory is stored). The attribute data, $A=\{\vec{a}_i\}_{i=1}^N$, contains several attribute value vectors, $A_k=\{\vec{a}_{i,k}\}_{i=1}^N$, which contains a fixed number attribute values, $a_{i,k}$, for discrete data and a range of values for continuous data. The attribute variables are the same for all time series.

Figure 22:
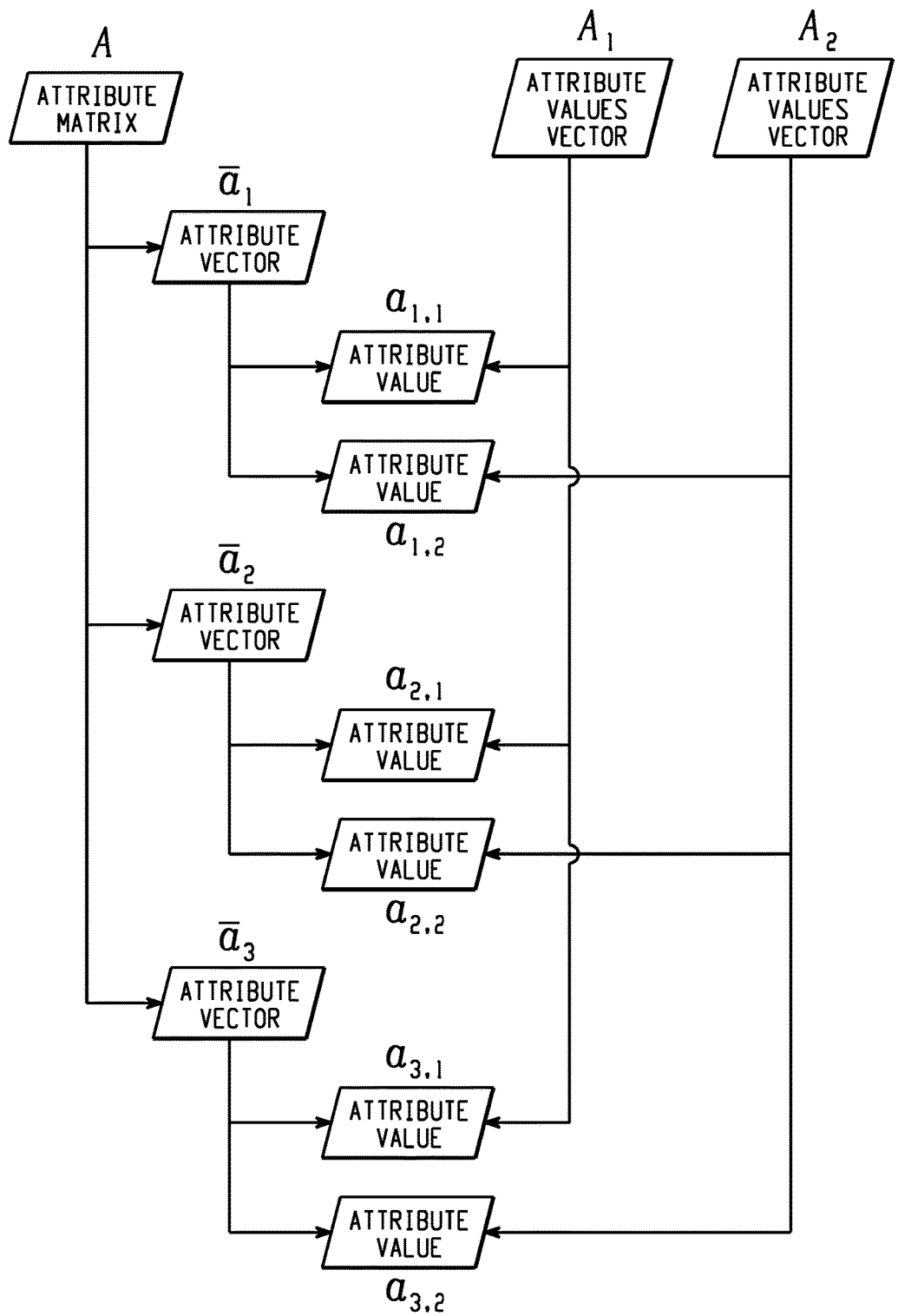
FIG. 22 depicts an example internal representation of the attribute data.

FIG. 22 depicts an example internal representation of the Attribute Data.

Reading and Writing the Attribute Data

The data set associated with Attributes may be quite large. It may be desirable to only read data once if possible. The user may be warned if the data set is to be reread.

Reading/writing attribute data into/out of memory can be performed as follows:

For each attribute vector (or by group), read/write all of the attribute values associated with the by group.

Figure 23:
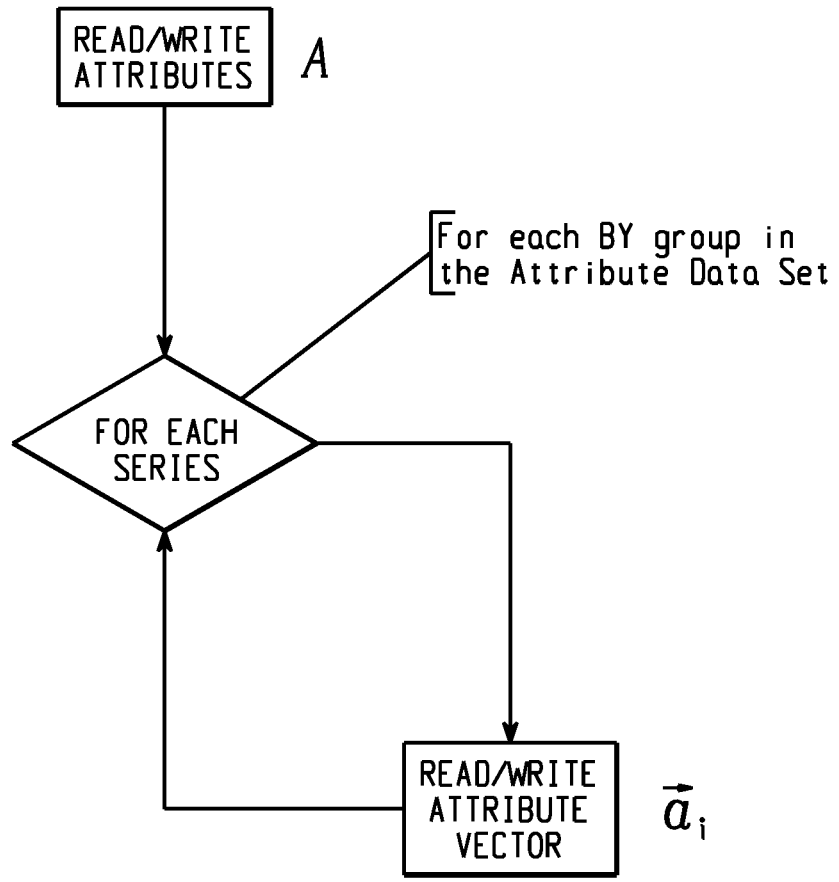
FIG. 23 depicts reading/writing of the attribute data.

FIG. 23 depicts reading/writing of the attribute data.

In some implementations it may be desirable to limit or reduce an amount of data stored. The following discussion describes some practical concepts related to the storage and representation of the reduced data.

Storage of Reduced Data

Table 4 depicts storage of the Reduced Data.

TABLE 4

Reduced Data Storage

| A | B | C | i (implied) | $r_{i,1}$ | $r_{i,2}$ | ... | $r_{i,M}$ |
|---|---|---|---|---|---|---|---|
| AA | BB | CC | 1 | | | | |
| AA | BBB | CCC | 2 | | | | |
| AAA | BBBB | CCCC | 3 | | | | |
| | | | | VECTOR | VECTOR | VECTOR | VECTOR |

Table 4 represents a reduced data set, $R=\{\vec{r}_i\}_{i=1}^N$. The right half of each row of the table represents a reduced data vector for single time series, $\vec{r}_i=\{r_{i,m}\}_{m=1}^M$. Each reduced variable column represents a reduced value vector across all time series, $R_m=\{r_{i,m}\}_{i=1}^N$. Each table cell represents a single reduced value, $r_{i,m}$.

Table 5 describes areas (e.g., the empty boxes in rows 1-4, the empty boxes in rows 5-7, or the empty boxes in rows 8-11) of the following table associated with the Panel Series.

TABLE 5

Panel Series Data Example

| Row | A | B | C | i (implied) | t (implied) | $y_{i,t}$ | $x_{i,1,t}$ | $x_{i,2,t}$ | $x_{i,3,t}$ |
|---|---|---|---|---|---|---|---|---|---|
| 1 | AA | BB | CC | 1 | 2 | | | | |
| 2 | AA | BB | CC | 1 | 3 | | | | |
| 3 | AA | BB | CC | 1 | 4 | | | | |
| 4 | AA | BB | CC | 1 | 5 | | | | |
| 5 | AA | BBB | CCC | 2 | 1 | | | | |
| 6 | AA | BBB | CCC | 2 | 2 | | | | |
| 7 | AA | BBB | CCC | 2 | 3 | | | | |
| 8 | AAA | BBBB | CCCC | 3 | 3 | | | | |
| 9 | AAA | BBBB | CCCC | 3 | 4 | | | | |
| 10 | AAA | BBBB | CCCC | 3 | 5 | | | | |
| 11 | AAA | BBBB | CCCC | 3 | 6 | | | | |
| | | | | | | VECTOR | VECTOR | VECTOR | VECTOR |

Notice that the Panel Series has a time dimension but the Reduced Data do not Sometimes, the reduced data set is much smaller than the panel series data set. Tables 4 and 5 show that the series index, i=1, . . . , N, are a one-to-one mapping between the tables. The mapping is unique but there may be time series data with no associated reduced data (missing attributes) and reduced data with no time series data (missing time series data).

Dimension reduction may transform the series table (T×N) to the reduced table (N×M) where T=max{$T_1$, . . . , $T_N$} and where typically M<T. The number of series, N, can be quite large; therefore, even a simple reduction transform may manipulate a large amount of data. Hence, it is important to get the data in the proper format to avoid the post-processing of large data sets.

Time series analysts may often desire to analyze the reduced table set in longitudinal form, whereas data miners often may desire analyze the reduced data set in coordinate form.

Transposing a large table from longitudinal form to coordinate form and vice-versa form can be computationally expensive.

In some implementations a time series exploration system may make certain distance computations. The following discussion describes some practical concepts related to the storage and representation of the distance.

Storage of Distance Matrix

Table 6 describes the storage of the Distance.

TABLE 6

Distance Storage

| A | B | C | i (implied) | $d_{i,1}$ | $d_{i,2}$ | ... | $d_{i,N}$ |
|---|---|---|---|---|---|---|---|
| AA | BB | CC | 1 | | | | |
| AA | BBB | CCC | 2 | | | | |
| AAA | BBBB | CCCC | 3 | | | | |
| | | | | VECTOR | VECTOR | VECTOR | VECTOR |

Table 6 represents a distance matrix data set, $D=\{\vec{d}_i\}_{i=1}^N$. The right half of each row of the table represents a distance vector for single time series, $\vec{d}_i=\{d_{i,j}\}_{j=1}^N$. Each distance variable column represents a distance measure vector across all time series, $D_j=\{d_{i,j}\}_{i=1}^N$. Each table cell represents a single distance measure value, $d_{i,j}$.

Table 7 describes areas (e.g., the empty boxes in rows 1-4, the empty boxes in rows 5-7, or the empty boxes in rows 8-11) of the following table associated with the Panel Series.

TABLE 7

Panel Series Example

| Row | A | B | C | i (implied) | t (implied) | $y_{i,t}$ | $x_{i,1,t}$ | $x_{i,2,t}$ | $x_{i,3,t}$ |
|---|---|---|---|---|---|---|---|---|---|
| 1 | AA | BB | CC | 1 | 2 | | | | |
| 2 | AA | BB | CC | 1 | 3 | | | | |
| 3 | AA | BB | CC | 1 | 4 | | | | |
| 4 | AA | BB | CC | 1 | 5 | | | | |
| 5 | AA | BBB | CCC | 2 | 1 | | | | |
| 6 | AA | BBB | CCC | 2 | 2 | | | | |
| 7 | AA | BBB | CCC | 2 | 3 | | | | |
| 8 | AAA | BBBB | CCCC | 3 | 3 | | | | |
| 9 | AAA | BBBB | CCCC | 3 | 4 | | | | |
| 10 | AAA | BBBB | CCCC | 3 | 5 | | | | |
| 11 | AAA | BBBB | CCCC | 3 | 6 | | | | |
| | | | | | | VECTOR | VECTOR | VECTOR | VECTOR |

Notice that the Panel Series has a time dimension but the Distance Matrix does not. Typically, the distance matrix data set is much smaller than the panel series data set.

Table 7 shows that the series index, i=1, . . . , N, are a one-to-one mapping between the tables. The mapping is unique but there may be time series data with no associated distance measures (missing measures) and distance measures without time series data (missing time series data).

In some implementations a time series exploration system may store derived data. The following discussion describes some practical concepts related to the storage and representation of the attribute data.

Storage of Derived Attribute Data

Table 8 describes storage of the derived attribute data.

TABLE 8

Derived Attribute Data Storage

| A | B | C | i (implied) | $g_{i,1}$ | $g_{i,2}$ | $g_{i,3}$ | $g_{i,4}$ |
|---|---|---|---|---|---|---|---|
| AA | BB | CC | 1 | | | | |
| AA | BBB | CCC | 2 | | | | |
| AAA | BBBB | CCCC | 3 | | | | |
| | | | | VECTOR | VECTOR | VECTOR | VECTOR |

Table 8 represents a derived attribute data set, $G=\{\vec{g}_i\}_{i=1}^{N}$. The right half of each row of the table represents a derived attribute vector for single time series, $\vec{d}_i=\{g_{i,j}\}_{j=1}^{J}$. Each attribute variable column represents a derived attribute value vector across all time series, $G_j=\{g_{i,j}\}_{i=1}^{N}$. Each table cell represents a single derived attribute value, $g_{i,j}$.

Internal Representation of Attribute Data

The amount of data associated with the derived attributes may be quite large. The derived attribute data may be represented efficiently in memory (e.g., only one copy of the data in memory is stored).

The derived attribute data, $G=\{\vec{g}_i\}_{i=1}^{N}$, contains several derived attribute value vectors, $G_j=\{g_{i,j}\}_{i=1}^{N}$, which contains a fixed number derived attribute values, $g_{i,j}$, for discrete data and a range of values for continuous data. The derived attribute variables are the same for all time series.

Figure 24:
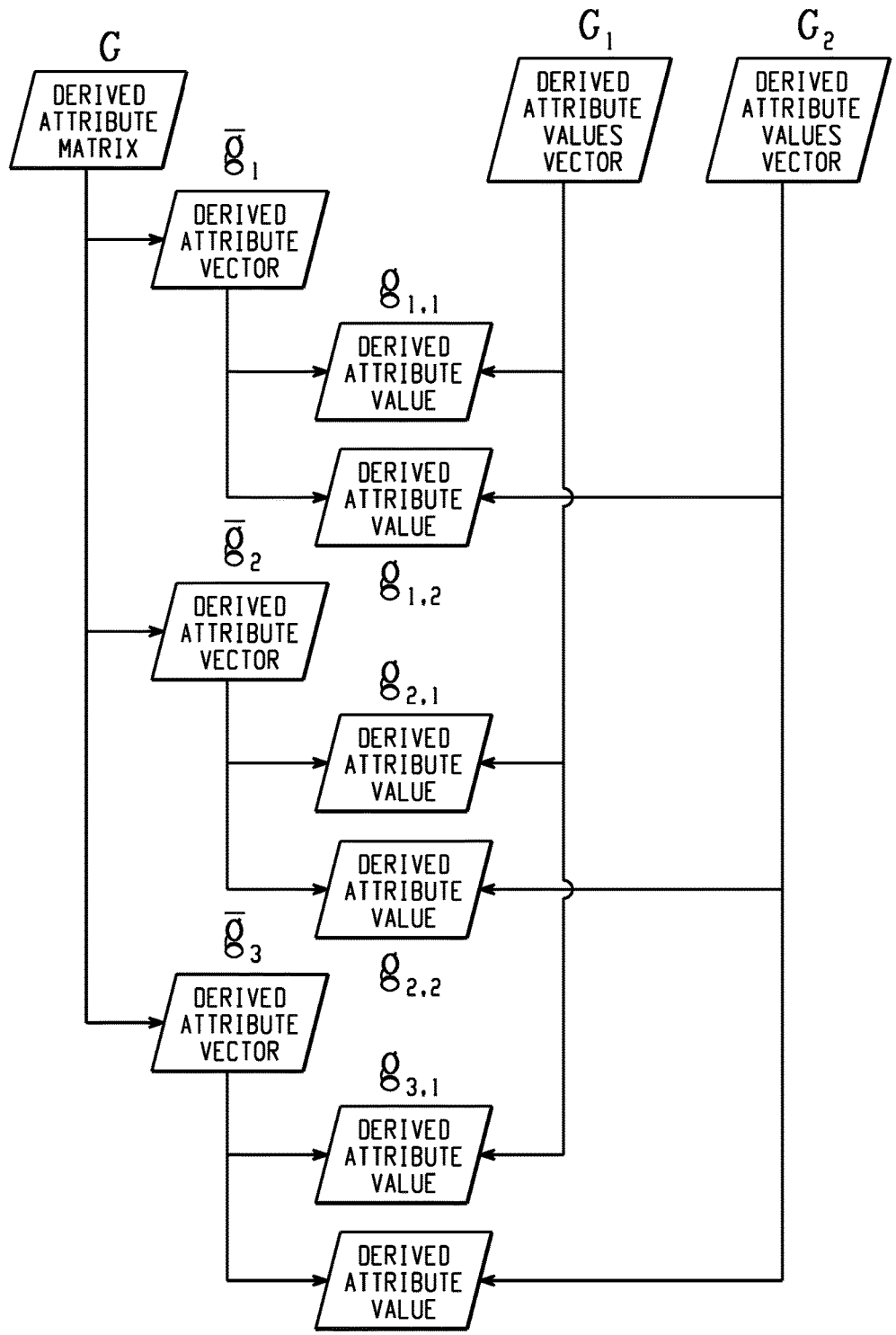
FIG. 24 depicts an internal representation of derived attribute data.

FIG. 24 depicts an internal representation of derived attribute data.

Reading and Writing the Derived Attribute Data

The data set associated with Derived Attributes may be quite large. It may be desirable to only read data once if possible. The user may be warned if the data set is to be reread.

Reading/writing derived attribute data into/out of memory may be performed as follows:

For each Derived Attribute Vector (or by group), read/write all of the derived attribute values associated with the by group.

Figure 25:
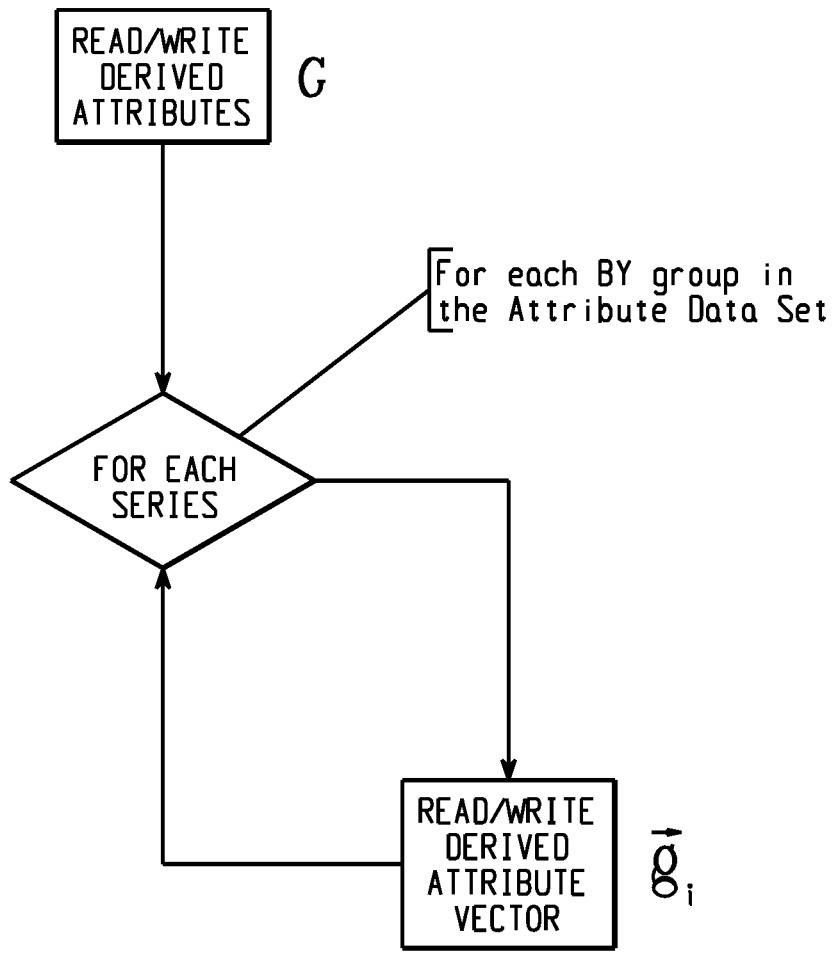
FIG. 25 depicts reading/writing of derived attribute data.

FIG. 25 depicts reading/writing of derived attribute data.

Figure 26A:
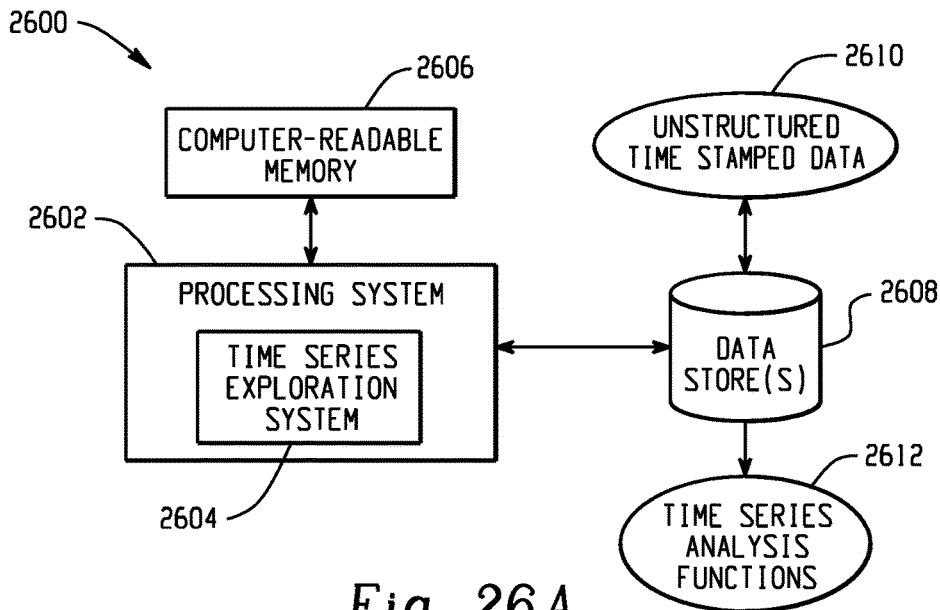
FIGS. 26A, 26B, and 26C depict example systems for use in implementing a time series exploration system.
Figure 26B:
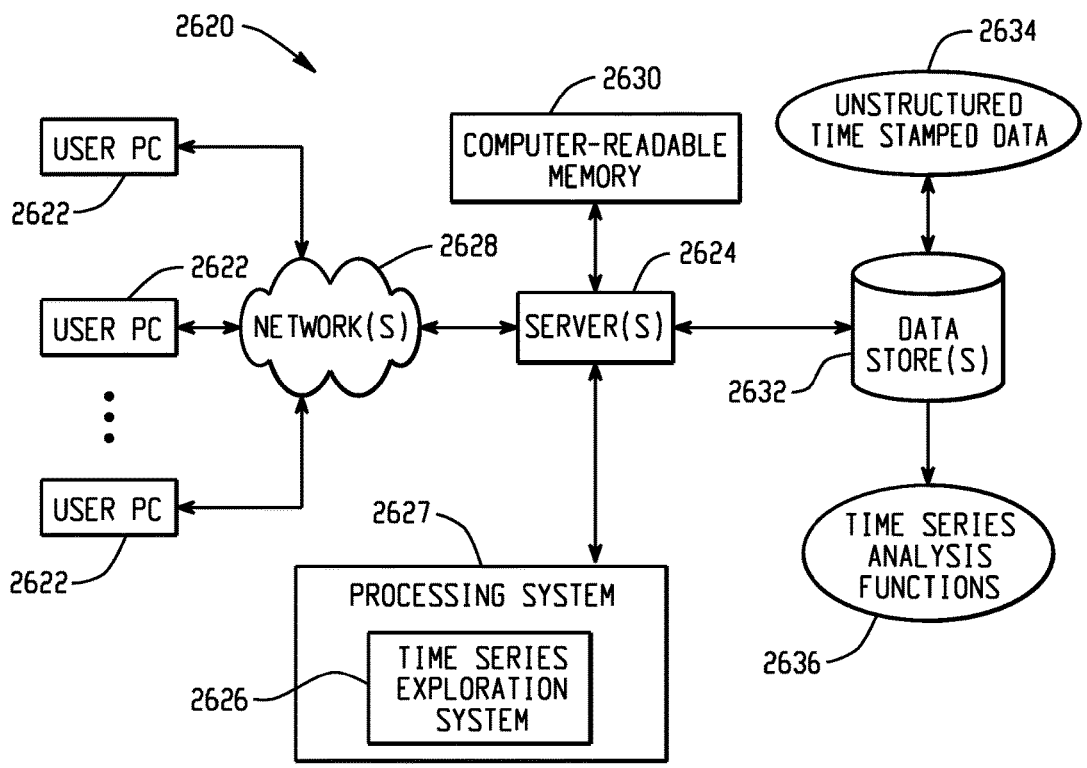
Figure 26C:
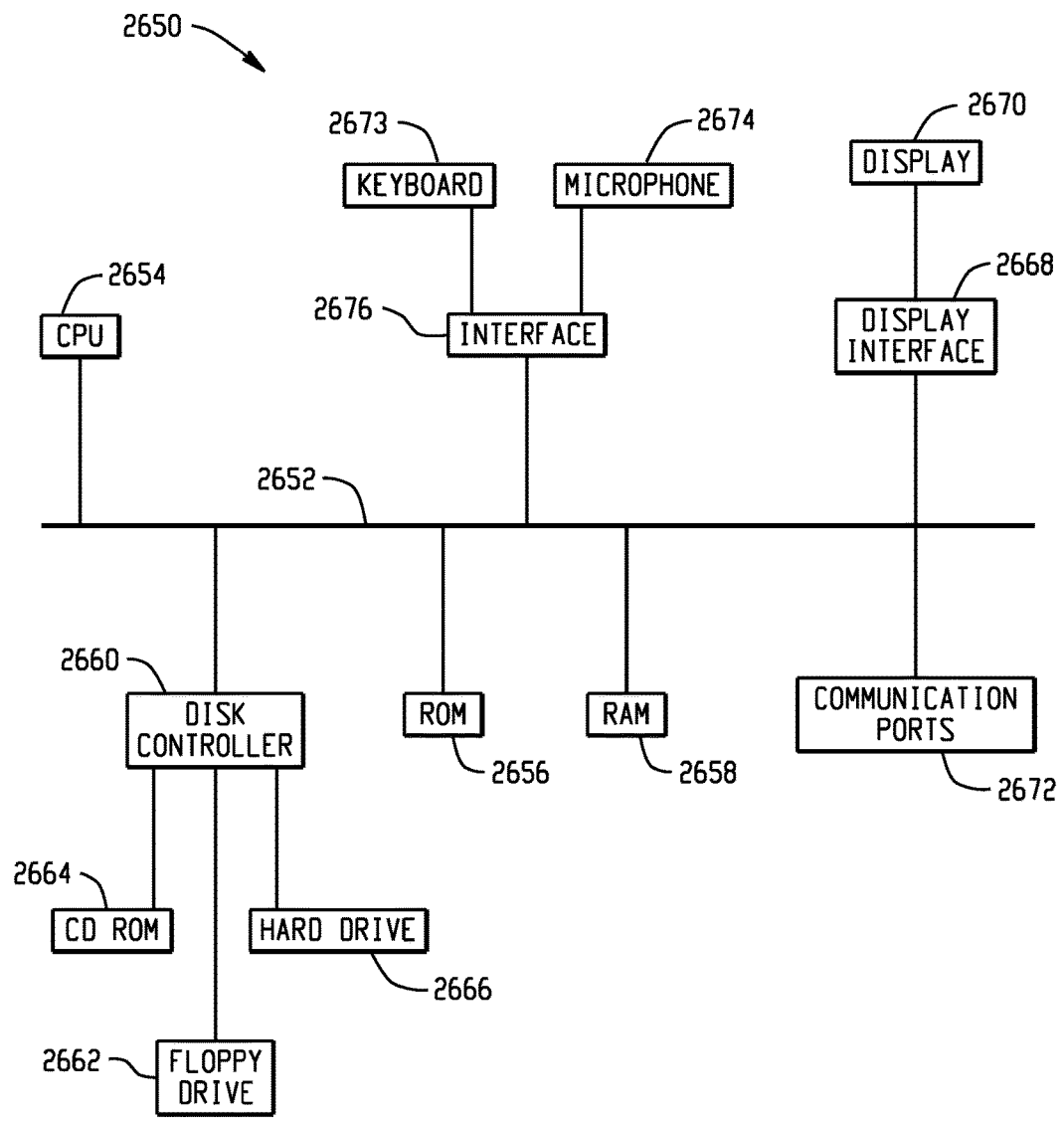

FIGS. 26A, 26B, and 26C depict example systems for use in implementing a time series exploration system. For example, FIG. 26A depicts an exemplary system 2600 that includes a standalone computer architecture where a processing system 2602 (e.g., one or more computer processors located in a given computer or in multiple computers that may be separate and distinct from one another) includes a time series exploration system 2604 being executed on it. The processing system 2602 has access to a computer-readable memory 2606 in addition to one or more data stores 2608. The one or more data stores 2608 may include unstructured time stamped data 2610 as well as time series analysis functions 2612.

FIG. 26B depicts a system 2620 that includes a client server architecture. One or more user PCs 2622 access one or more servers 2624 running a time series exploration system 2626 on a processing system 2627 via one or more networks 2628. The one or more servers 2624 may access a computer readable memory 2630 as well as one or more data stores 2632. The one or more data stores 2632 may contain an unstructured time stamped data 2634 as well as time series analysis functions 2636.

FIG. 26C shows a block diagram of exemplary hardware for a standalone computer architecture 2650, such as the architecture depicted in FIG. 26A that may be used to contain and/or implement the program instructions of system embodiments of the present invention. A bus 2652 may serve as the information highway interconnecting the other illustrated components of the hardware. A processing system 2654 labeled CPU (central processing unit) (e.g., one or more computer processors at a given computer or at multiple computers), may perform calculations and logic operations required to execute a program. A processor-readable storage medium, such as read only memory (ROM) 2656 and random access memory (RAM) 2658, may be in communication with the processing system 2654 and may contain one or more programming instructions for performing the method of implementing a time series exploration system. Optionally, program instructions may be stored on a non-transitory computer readable storage medium such as a magnetic disk, optical disk, recordable memory device, flash memory, or other physical storage medium.

A disk controller 2660 interfaces one or more optional disk drives to the system bus 2652. These disk drives may be external or internal floppy disk drives such as 2662, external or internal CD-ROM, CD-R, CD-RW or DVD drives such as 2664, or external or internal hard drives 2666. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 2660, the ROM 2656 and/or the RAM 2658. Preferably, the processor 2654 may access each component as required.

A display interface 2668 may permit information from the bus 2652 to be displayed on a display 2670 in audio, graphic, or alphanumeric format. Communication with external devices may optionally occur using various communication ports 2672.

In addition to the standard computer-type components, the hardware may also include data input devices, such as a keyboard 2673, or other input device 2674, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A system comprising:
one or more processors;
one or more computer-readable storage mediums containing instructions configured to cause the one or more processors to perform operations including:
analyzing, in a single-read pass, a distribution of time-stamped unstructured data to identify a plurality of potential time series data hierarchies for structuring the unstructured data, wherein a potential time series data hierarchy is a framework for structuring the unstructured data using time series;
deriving, in the single-read pass, multiple structured time series from the unstructured data according to a selected time series data hierarchy, wherein the selected time series data hierarchy is selected from the plurality of potential time series data hierarchies;
identifying, in the single-read pass, one or more user-specified time series analysis functions from a functions repository based on a function specification and the multiple structured time series, wherein the function specification describes the contents of the functions repository;
generating, in the single-read pass, multiple updated structured time series using the identified time series analysis functions from the functions repository, wherein the updated structured time series is generated by applying the identified time series analysis functions to the multiple structured time series; and
generating an output time series forecast corresponding to one or more of the multiple updated structured time series.

2. The system of claim 1, wherein a potential time series data hierarchy includes a dimension associated with attribute variables, and wherein the function specification maps each function in the functions repository to attribute variables in the time-stamped unstructured data for re-use with other data sets after the time-stamped unstructured data has been structured.

3. The system of claim 2, wherein the function specification uses a function specification API to processes the user-specified time series analysis functions, and to map each function to attribute variables in the time-stamped unstructured data.

4. The system of claim 1, wherein analyzing the distribution of time-stamped unstructured data includes identifying a plurality of time series frequencies, wherein deriving the multiple structured time series from the unstructured data includes using an optimal time series frequency from the plurality of time series frequencies, and wherein the optimal time series frequency is associated with the selected time series data hierarchy.

5. The system of claim 1, wherein generating the output data set includes using an output specification, wherein the output specification describes a form of the output data set.

6. The system of claim 1, wherein the operations further comprise:
generating, in the single-read pass, a set of results using a results specification and the output time series forecast, wherein the results specification describes a tabular and graphical display for visualization of the set of results.

7. The system of claim 1, wherein the set of time series analysis functions includes at least a reduction function, and wherein generating the updated structured time series uses the reduction function.

8. The system of claim 7, wherein the updated structured time series is a summarized, reduced version of the multiple structured time series.

9. The system of claim 1, wherein the set of time series analysis functions includes at least a transformation function, and wherein generating the updated structured time series uses the transformation function.

10. The system of claim 1, wherein the operations further comprise:
generating the output time series forecast using parallelization, wherein each of the multiple updated structured time series are processed separately on separate computational threads.

11. A computer-program product tangibly embodied in a non-transitory machine-readable storage medium, including instructions configured to cause a data processing apparatus to perform operations including:
analyzing, in a single-read pass, a distribution of time-stamped unstructured data to identify a plurality of potential time series data hierarchies for structuring the unstructured data, wherein a potential time series data hierarchy is a framework for structuring the unstructured data using time series;

deriving, in the single-read pass, multiple structured time series from the unstructured data according to a selected time series data hierarchy, wherein the selected time series data hierarchy is selected from the plurality of potential time series data hierarchies;

identifying, in the single-read pass, one or more user-specified time series analysis functions from a functions repository based on a function specification and the multiple structured time series, wherein the function specification describes the contents of the functions repository;

generating, in the single-read pass, multiple updated structured time series using the identified time series analysis functions from the functions repository, wherein the updated structured time series is generated by applying the identified time series analysis functions to the multiple structured time series; and generating an output time series forecast corresponding to one or more of the multiple updated structured time series.

12. The computer-program product of claim 11, wherein a potential time series data hierarchy includes a dimension associated with attribute variables, and wherein the function specification maps each function in the functions repository to attribute variables in the time-stamped unstructured data for re-use with other data sets after the time-stamped unstructured data has been structured.

13. The computer-program product of claim 12, wherein the function specification uses a function specification API to processes the user-specified time series analysis functions, and to map each function to attribute variables in the time-stamped unstructured data.

14. The computer-program product of claim 11, wherein analyzing the distribution of time-stamped unstructured data includes identifying a plurality of time series frequencies, wherein deriving the multiple structured time series from the unstructured data includes using an optimal time series frequency from the plurality of time series frequencies, and wherein the optimal time series frequency is associated with the selected time series data hierarchy.

15. The computer-program product of claim 11, wherein generating the output data set includes using an output specification, wherein the output specification describes a form of the output data set.

16. The computer-program product of claim 11, wherein the operations further comprise:
generating, in the single-read pass, a set of results using a results specification and the output time series forecast, wherein the results specification describes a tabular and graphical display for visualization of the set of results.

17. The computer-program product of claim 11, wherein the set of time series analysis functions includes at least a reduction function, and wherein generating the updated structured time series uses the reduction function.

18. The computer-program product of claim 17, wherein the updated structured time series is a summarized, reduced version of the multiple structured time series.

19. The computer-program product of claim 11, wherein the set of time series analysis functions includes at least a transformation function, and wherein generating the updated structured time series uses the transformation function.

20. The computer-program product of claim 11, wherein the operations further comprise:

generating the output time series forecast using parallelization, wherein each of the multiple updated structured time series are processed separately on separate computational threads.

21. A computer-implemented method, the method comprising:

analyzing, in a single-read pass, a distribution of time-stamped unstructured data to identify a plurality of potential time series data hierarchies for structuring the unstructured data, wherein a potential time series data hierarchy is a framework for structuring the unstructured data using time series;

deriving, in the single-read pass, multiple structured time series from the unstructured data according to a selected time series data hierarchy, wherein the selected time series data hierarchy is selected from the plurality of potential time series data hierarchies;

identifying, in the single-read pass, one or more user-specified time series analysis functions from a functions repository based on a function specification and the multiple structured time series, wherein the function specification describes the contents of the functions repository;

generating, in the single-read pass, multiple updated structured time series using the identified time series analysis functions from the functions repository, wherein the updated structured time series is generated by applying the identified time series analysis functions to the multiple structured time series; and generating an output time series forecast corresponding to one or more of the multiple updated structured time series.

22. The method of claim 21, wherein a potential time series data hierarchy includes a dimension associated with attribute variables, and wherein the function specification maps each function in the functions repository to attribute variables in the time-stamped unstructured data for re-use with other data sets after the time-stamped unstructured data has been structured.

23. The method of claim 22, wherein the function specification uses a function specification API to processes the user-specified time series analysis functions, and to map each function to attribute variables in the time-stamped unstructured data.

24. The method of claim 21, wherein analyzing the distribution of time-stamped unstructured data includes identifying a plurality of time series frequencies, wherein deriving the multiple structured time series from the unstructured data includes using an optimal time series frequency from the plurality of time series frequencies, and wherein the optimal time series frequency is associated with the selected time series data hierarchy.

25. The method of claim 21, wherein generating the output data set includes using an output specification, wherein the output specification describes a form of the output data set.

26. The method of claim 21, further comprising:
generating, in the single-read pass, a set of results using a results specification and the output time series forecast, wherein the results specification describes a tabular and graphical display for visualization of the set of results.

27. The method of claim 21, wherein the set of time series analysis functions includes at least a reduction function, and wherein generating the updated structured time series uses the reduction function.

28. The method of claim 27, wherein the updated structured time series is a summarized, reduced version of the multiple structured time series.

29. The method of claim 21, wherein the set of time series analysis functions includes at least a transformation function, and wherein generating the updated structured time series uses the transformation function.

30. The method of claim 21, further comprising:
   generating the output time series forecast using parallelization, wherein each of the multiple updated structured time series are processed separately on separate computational threads.

* * * * *